United States Patent
Luitjens et al.

(10) Patent No.: US 12,099,848 B2
(45) Date of Patent: Sep. 24, 2024

(54) AUTOMATIC COMPUTE KERNEL GENERATION

(71) Applicant: NVIDIA Corporation, Santa Clara, CA (US)

(72) Inventors: Justin Paul Luitjens, Sandy, UT (US); Clifford Keith Burdick, Vista, CA (US); Jacob Ryan Hemstad, Bloomington, MN (US)

(73) Assignee: Nvidia Corporation, Santa Clara, CA (US)

( * ) Notice: Subject to any disclaimer, the term of this patent is extended or adjusted under 35 U.S.C. 154(b) by 462 days.

(21) Appl. No.: 17/389,118

(22) Filed: Jul. 29, 2021

(65) Prior Publication Data

US 2023/0039180 A1 Feb. 9, 2023

(51) Int. Cl.
*G06F 9/38* (2018.01)
*G06F 9/30* (2018.01)
*G06F 9/355* (2018.01)
*G06F 9/54* (2006.01)

(52) U.S. Cl.
CPC .......... *G06F 9/3877* (2013.01); *G06F 9/3001* (2013.01); *G06F 9/3555* (2013.01); *G06F 9/545* (2013.01)

(58) Field of Classification Search
CPC .... G06F 9/3877; G06F 9/3001; G06F 9/3555; G06F 9/545; G06F 8/10; G06F 8/311; G06F 8/437; G06F 8/4443; G06F 9/4484; G06F 2209/509; G06F 9/5027
See application file for complete search history.

(56) References Cited

U.S. PATENT DOCUMENTS

| | | | | |
|---|---|---|---|---|
| 5,835,771 A | * | 11/1998 | Veldhuizen | G06F 8/437 717/154 |
| 10,409,560 B1 | * | 9/2019 | Bebee | G06F 8/4441 |
| 2006/0036997 A1 | * | 2/2006 | Low | G06F 8/36 717/113 |
| 2008/0209394 A1 | * | 8/2008 | Andersen | G06F 9/44521 715/966 |
| 2013/0159982 A1 | * | 6/2013 | Lerios | G06T 1/20 717/146 |

OTHER PUBLICATIONS

"C++ meta-programming: overloading of arithmetic operators for types," May 2014, https://stackoverflow.com/questions/23651542/c-meta-programming-overloading-of-arithmetic-operators-for-types (Year: 2014).*

"Generalized chaining of non-member functions in C++," Sep. 2011; https://stackoverflow.com/questions/7538888/generalized-chaining-of-non-member-functions-in-c (Year: 2011).*

* cited by examiner

*Primary Examiner* — Farley Abad
(74) *Attorney, Agent, or Firm* — Lowenstein Sandler LLP

(57) ABSTRACT

Apparatuses, systems, and techniques to receive, by a processor of a computer system, one or more operations for a kernel; automatically generate, by the processor, one or more operators that perform the one or more operations on elements of one or more input data structures; and automatically generate, by the processor, the kernel that comprises the one or more operators.

20 Claims, 23 Drawing Sheets

```
// a, b, c are views or operators auto op = set(d, abs(a * b + c));   // Create operator, Matlab: d = abs(a.*b.+c)
sigxExecuteOp(op, stream);          // Actually Execute operator sigxExecuteOp(set(d, abs(a * b + c), stream);  // Same as above but inline
```

410 →
420 →
430 →

FIG. 4

# AUTOMATIC COMPUTE KERNEL GENERATION

TECHNICAL FIELD

At least one embodiment pertains to processing resources used to generate and execute compute kernels at a processor of a computer system. For example, at least one embodiment pertains to processors or computing systems used to automatically generate compute kernels for executing mathematical and logical operations according to various novel techniques described herein.

BACKGROUND

Compute kernels are used for computing mathematical operations, logical operations, and/or any generic pointwise operations. Kernels are typically created manually by users for each operation that they are seeking to perform. Creating an efficient kernel manually, however, can be a challenging task for users. For example, domain scientists who create kernels are generally unfamiliar with complex programming techniques including programming complex kernels. Additionally, the types of operations that a user may wish to perform on a graphical processing unit (GPU) using a kernel, as well as the sequence of performing these operations, is virtually unlimited, thus introducing further complexities and inefficiencies into the task of manually generating compute kernels by users.

BRIEF DESCRIPTION OF DRAWINGS

FIG. 4 illustrates a set of operators for defining and executing a compute kernel for performing certain operations at a GPU, in accordance with at least one embodiment;

DETAILED DESCRIPTION

Figure 1:
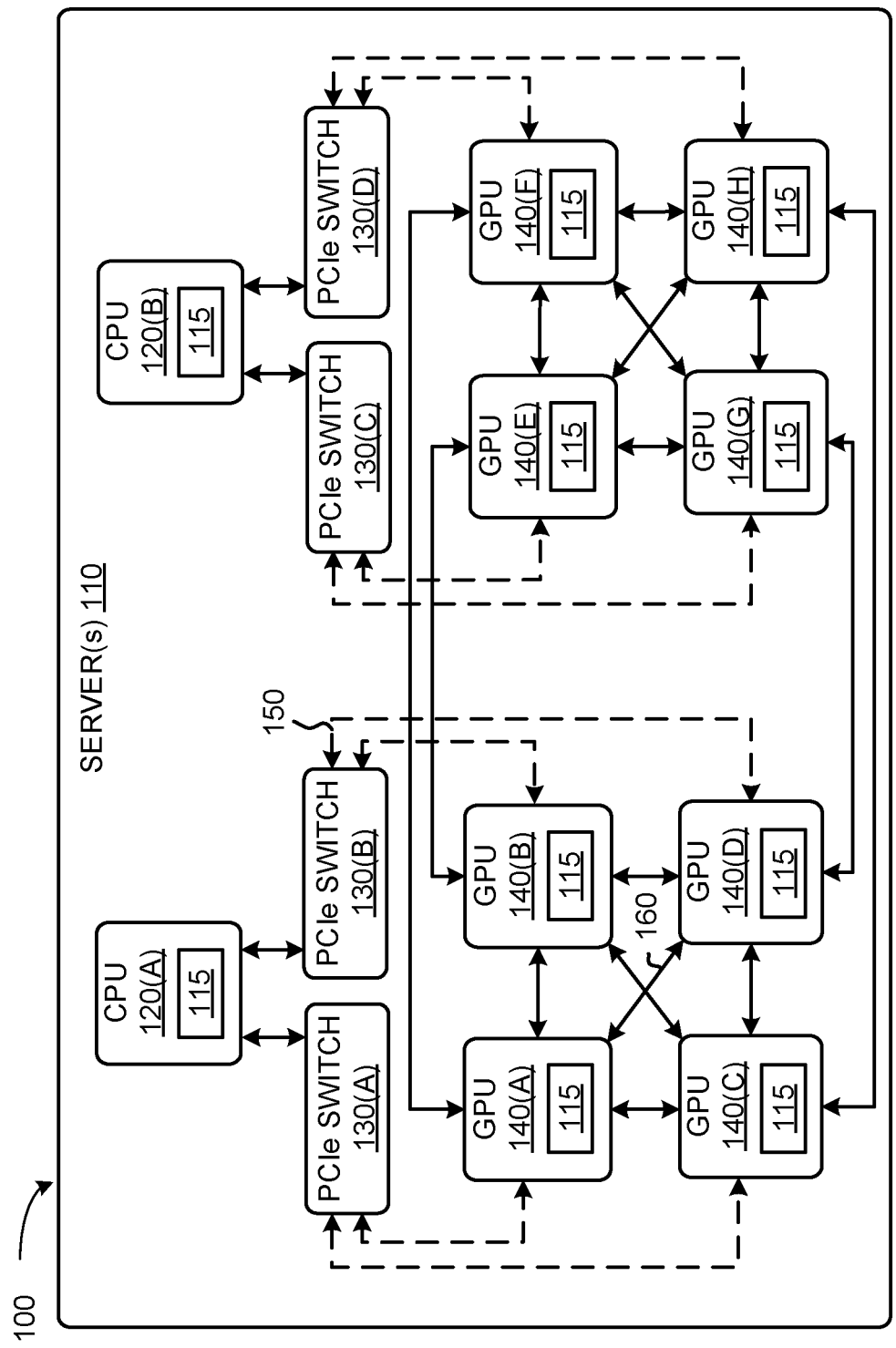
FIG. 1 illustrates a computer system for hosting and executing kernel generation component, according to at least one embodiment.

Automatic Compute Kernel Generation and Delayed Execution

In at least one embodiment, a compute kernel includes a routine compiled for high throughput accelerators, such as graphics processing units (GPUs), digital signal processors (DSPs), or field-programmable gate arrays (FPGAs). In at least one embodiment, compute kernels may be separate from, but used by, a main program, which may run on accelerators or on one or more central processing units (CPUs). In at least one embodiment, a compute kernel may be a Compute Unified Device Architecture (CUDA) kernel, a DirectCompute kernel, an OpenMP kernel, an OpenCL kernel, an SYCL kernel, or other type of kernel. In at least one embodiment, a compute kernel is a kernel for execution on a CPU or general processing device.

In at least one embodiment, an approach of implementing a type system that enables automatic generation of compute kernels using general mathematical and logical expressions is provided. A software library may implement this approach by overloading the type system to construct various operators on tensors and/or other data structures as inputs to the operators. Additionally, the library uses template metaprogramming for constructing chains of operators using simple mathematical expressions. Using template metaprogramming, a user of the library can combine a number of operators to compose a new operator for performing a more complex task in a single operation. Operators that can be combined include the standard mathematical, logical, bitwise, and comparison operators, standard mathematical functions (max, min, abs, etc.), trigonometric functions, and/or any generic pointwise function. In order to generate the kernel automatically, the user of the library first defines the kernel operations using application programming interfaces (API)s provided by the library. The library can then use techniques such as template metaprogramming and operator overloading to execute and compile the set of user provided operations. Each operation of the kernel can have one or more tensors and/or one or more operators on tensors as inputs. The kernel can be automatically generated on a host (e.g., CPU) and then later executed on a device (e.g., GPU).

Embodiments enable a user to use metaprogramming to define any arbitrary simple or complex operation using, for example, mathematical and/or Boolean expressions. The operation, whether it is a simple operation or a complex operation, may be input without defining inputs, outputs, types, configuration parameters, and so on that is generally manually determined and written out into a kernel when a user writes the code for the kernel. Processing logic may then analyze the operation, may detect types of inputs and outputs of the operation, may normalize ranks of inputs and output data structures having different ranks, and may upon compilation, may generate a single kernel for performing the operation. The single kernel may be deployed to a GPU, or other processors, for execution.

The present disclosure provides techniques and methods for an efficient way for users to generate kernels supporting various combinations of operators without having to write low level code to implement the required operators. Combining operator overloading and template metaprogramming to automatically generate, by a host, kernels for execution on a device enables a light weight process of defining a composable kernel. Additionally, using template metaprogramming and operator overloading to combine operators into a single function simplifies and reduces the amount of code that a user needs to write manually when building a kernel for execution on a GPU.

FIG. 1 illustrates a computer system 100 for hosting and executing kernel generation component 115, according to at least one embodiment. In at least one embodiment, system 100 may include, without limitation, one or more server(s) 110. In at least one embodiment, server(s) 110 may include, without limitation, a plurality of graphical processing units (GPU)s 140(A)-140(H) (collectively referred to herein as GPUs 140), PCIe switches 130(A)-130(D) (collectively referred to herein as PCIe switches 130), and/or central processing units (CPU)s 120(A)-120(B) (collectively referred to herein as CPUs 120). In at least one embodiment, GPUs 140, CPUs 120, and PCIe switches 130 may be interconnected with high-speed interconnects such as, for example and without limitation, NVLink interfaces 160 developed by NVIDIA and/or PCIe connections 150. In at least one embodiment, GPUs 140 are connected via an NVLink and/or NVSwitch SoC and GPUs 140 and PCIe switches 130 are connected via PCIe interconnects. Although eight GPUs 140, two CPUs 120, and four PCIe switches 130 are illustrated, this is not intended to be limiting. In at least one embodiment, each of server(s) 110 may include, without limitation, any number of GPUs 140, CPUs 120, and/or PCIe switches 130, in any combination. For example, in at least one embodiment, server(s) 110 could each include eight, sixteen, thirty-two, and/or more GPUs 140.

In at least one embodiment, server(s) 110 may receive data from vehicles, remote sources via a network, local sources, sensors, and so on, and apply data to up-to-date real-time neural networks for real-time intelligent inferencing. In at least one embodiment, server(s) 110 may include deep-learning supercomputers and/or dedicated AI computers powered by GPU(s) 140, such as a DGX and DGX Station machines developed by NVIDIA. However, in at least one embodiment, server(s) 110 may include deep learning infrastructure that uses CPU-powered data centers.

In at least one embodiment, server(s) 110 may include GPU(s) 140 and one or more programmable inference accelerators (e.g., s TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing.

In at least one embodiment, kernel generation component(s) 115 are used to perform one or more embodiments. In at least one embodiment, kernel generation component 115 may provide a technique for automatically generating a compute kernel by compiling a software source code representing one or more operations that define the kernel. In certain implementations, kernel generation component 115 may automatically generate a compute kernel that can be used for computing mathematical operations, logical operations, any generic pointwise operations, and/or a combination thereof using operator overloading and template metaprogramming. Examples of operations may include C++ operators such as +, −,/,*; function operators such as pow, exp, abs; control flow operations such as IF, IFELSE; indexing operators such as fftshift, reverse; and/or user defined call back operators to compute value based on inputs. In one implementation, when executing operators on data of type tensor or other multi-dimensional data structure, kernel generation component 115 may expand or contract one or more tensors in order to properly perform the operator, for example to normalize input parameters to the operator to have the same rank before performing the operator. In an illustrated example, tensor rank may be expanded by repeating smaller rank tensors, such that in an addition operation of $C_2=A_2+B_1$, $B_1$ can be expanded to rank 2 by repeating it across outer-most dimension, where the subscript represents a rank of the tensor. Similarly, tensor rank may be contracted by defining reduction operators. As an example, an operator matxReduce ($C_1$, $A_2+B_2$, MaxOp( )); may be used to compute max across inner-most dimensions of the output tensor of $A_2+B_2$. A result of the operation may then be stored in $C_1$.

In one implementation, kernel generation component 115 may generate the kernel at compile time of the software source code defining the operations of kernel. In another implementation, kernel generation component 115 may generate the kernel at run-time of an application corresponding to the compiled software source code defining the operations of kernel, such as with just-in-time compilation of kernels. In some implementations, kernel general components 115 may be a library that is composable, and that has an API that is usable with other APIs to automatically generate kernels, as discussed in more details herein below.

Generated compute kernels may be used by users for performing domain-specific operations on a GPU 140. As an example, a user may build a software application for processing radar signals such that the application may be executed on a GPU 140 of computer system 100. The user may then dynamically or statically integrate a library implementing kernel generation component 115 into their software code of the application and may utilize functionalities provided by the kernel generation component 115 to define complex mathematical and logical operations. Kernel generation component 115 may execute the complex operations by utilizing advanced programming techniques including operator overloading and template metaprogramming on multi-dimensional data structures (e.g., tensors) that are provided by the user. When the application is compiled, a compute kernel may be automatically generated and may be deployed to another processor of the same or different computer system for execution, as explained in more details herein below.

In certain implementations, kernel generation component 115 executing at a CPU 120 of a computer system may receive a set of operations defining a compute kernel. The set of operations may be received from a user accessing kernel generation component 115 within source code of a software application, seeking to perform the set of operations using the kernel on a CPU 120 or a GPU 140 of a computer system 100. In an illustrated example, the software application can be a radar signal processing application that may use kernel generation component 115 to perform mathematical, logical, and/or other pointwise operations on tensors or other data types that are processed by the set of operations.

In some implementations, kernel generation component 115 may implement a type system that enables automatic generation of compute kernels using general mathematical and/or logical expressions. In an illustrated example, kernel generation component may be executed within a software library that utilizes operator overloading to implement the type system by constructing various operators on tensors and/or other data structures as inputs to the operators. Operator overloading may refer to a feature within a programming language where different operators can have different implementations depending on their arguments. Operator overloading can be defined by the programming language, the programmer within their source code, and/or both, and it can allow user-defined types a similar level of syntactic support as types built into the programming language. In an implementation, kernel generation component 115 may implement operator overloading using a programming language such as C++, D programming language, C#, Python, MATLAB, Ada, and/or other programming languages.

In some implementations, the software library executing kernel generation component 115 may further utilize template metaprogramming for constructing chains of operators using simple mathematical expressions. In an implementation, template metaprogramming may refer to a metaprogramming technique in which generic programming templates are used by a compiler to generate temporary source code. The temporary source code may then be merged by the compiler with the rest of the source code and compiled, such that the output of compiling these templates can include compile-time constants, data structures, as well as generated functions. In some implementations, using template metaprogramming may enable a user to program an operation with one or more parameters having unspecified data types. By compiling the temporary source code of the operation using template metaprogramming, kernel generation component 115 can automatically determine a data type for each of the one or more parameters, e.g., by detecting a data type for each parameter during the generation of the temporary source code and utilizing the detected data type of the parameters during execution time of the generated kernel. Additionally, in certain implementations, using template metaprogramming, a user of the software library implementing kernel generation component 115 may combine a number of operators to compose a new operator for performing a more complex task in a single operation, thus simplifying and significantly reducing the amount of code that needs to be programmed by the user of the library for implementing the functionality to be performed by the number of operators, as explained in more details herein below. Additionally, combining a set of operators into a single new operator can improve the performance of the computer system by significantly reducing the number of reads of input data from memory and writes of output data to memory by each individual operator. Operators that can be combined include the standard mathematical, logical, bitwise, and comparison operators, standard mathematical functions (max, min, abs, etc.), trigonometric functions, and/or any generic pointwise function. In an implementation, kernel generation component 115 may implement template metaprogramming using a programming language such as C++, D programming language, Curel, XL programming language, and/or other programming languages.

In certain implementations, kernel generation component 115 may support delayed execution of the operations of the generated kernel, such that operations can be defined on a host system (e.g., a CPU) and then executed on a device such as a GPU of a same or different computer system as the CPU. Additionally, delayed execution of operations of the kernels enables a compiler to generate a single kernel for the set of defined operations when compiling the source code implementing the set of operations. As an example, a user utilizing kernel generation component 115 may first define the set of operations of the kernel that may be used to execute certain functionality at a GPU. The user may then invoke an executor function to execute the defined operations of the kernel. In certain implementations, kernel generation component 115 may construct expression templates of the set of operations using operator overloading and template metaprogramming on the host and delay execution of the operations until the generated kernel is executed on a device (e.g., by configuring the executor function to execute on a device represented by a GPU). Additionally or alternatively, an executor function may be executed on the host to loop over the dimensions of a multi-dimensional data structure to perform an operation on each element of the data structure, whereas an executor function executing on the device may invoke defined operations from the generated kernel to execute the defined operations at the device.

In at least one embodiment, optimization is achieved by inlining multiple expressions at compile time to cause a single large kernel to be generated with all data associated with the operations handled by one function. In computing, inline expansion, or inlining, is a compiler optimization that replaces a function call site with the body of the function that would be called. Accordingly, wherever a function is called, instead jumping to that function the code of the inline function is injected at compile time every place that given function is called. This optimization may improve time and space usage at runtime, at the possible cost of increasing the size of the final program. This may reduce or eliminate function calls between kernels during execution. Inlining may solve performance and maintainability issues by letting a programmer declare the function as inline, so that the code in the inline function is injected at compile time every place that given function is called.

Figure 2:
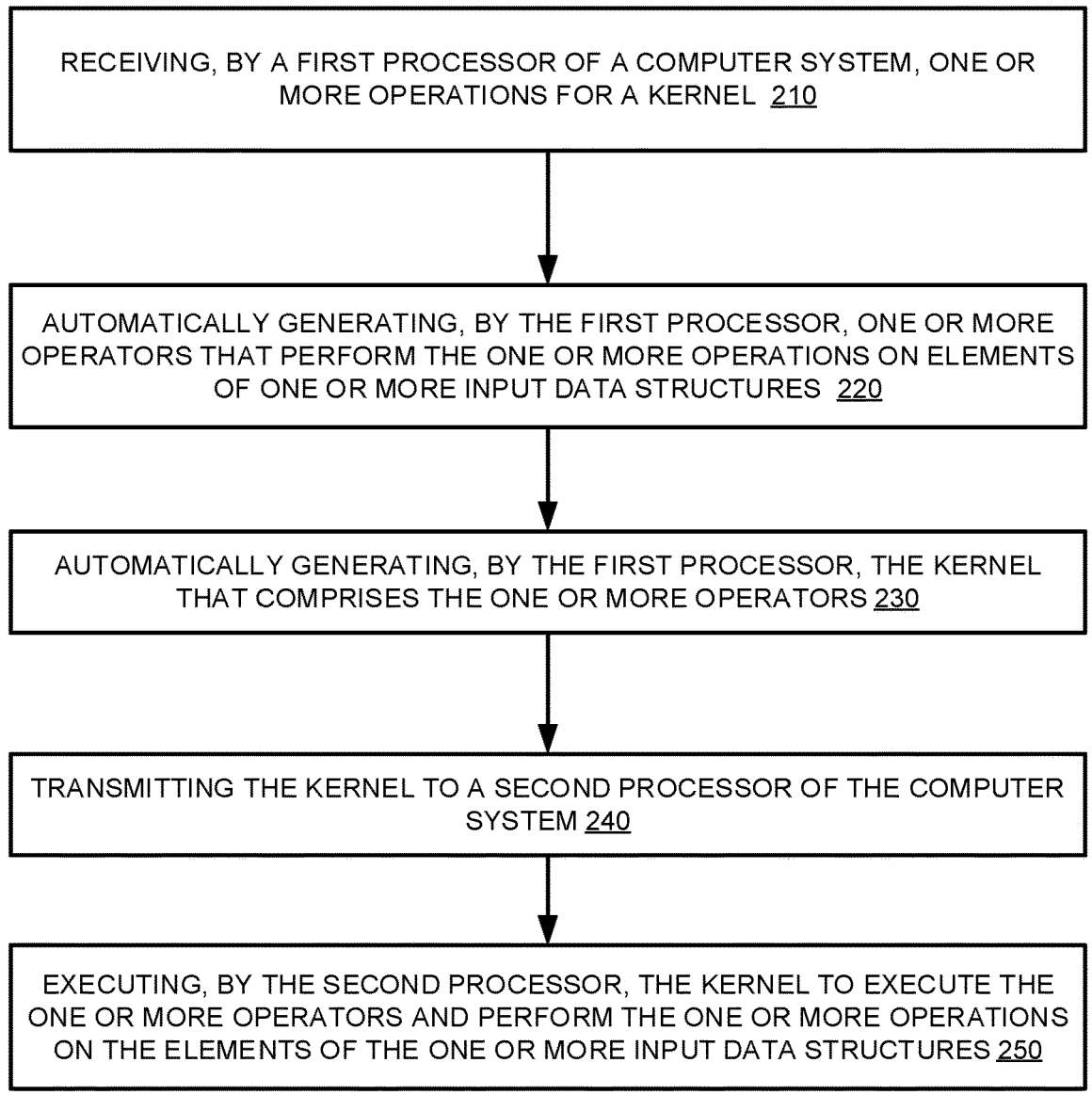
FIG. 2 is a flow diagram of a process for automatically generating a compute kernel to perform one or more operations at a processor of a computer system, in accordance with at least one embodiment.

FIG. 2 is a flow diagram of a process 200 for automatically generating a compute kernel to perform one or more operations at a processor of a computer system, in accordance with at least one embodiment. In at least one embodiment, a processing logic implementing process 200 may automatically generate, by a host CPU, a kernel for supporting various combinations of operators using techniques such as operator overloading and template metaprogramming. The combination of operators performs one or more operations provided by a user of the kernel in the form of user-supplied low level code or meta-code (e.g., simple operators/mathematical expressions). The generated kernel may then be executed on a device such as a CPU or GPU.

At operation 210, the processing logic receives, at a CPU of a computer system, a set of operations to be executed by a kernel at a GPU of the computer system. In certain implementations, each of the set of operations can have one or more tensors (or other data structures) and one or more operators on tensors as inputs to the operations, such that the operation can be performed on each element of the input tensors.

At operation 220, the processing logic automatically generates, at the CPU of the computer system, a set of operators that perform the set of operations on elements of the input tensors. In some implementations, the set of operations may include mathematical and/or logical expressions represented in a single programming function and/or in a single line of code. The processing logic may use the operator overloading technique to interpret and execute the mathematical expressions within the function based on the proper precedence of each expression, as explained in more details herein in FIG. 4. In an implementation, the processing logic can perform the set of operations on each element of an input tensor by executing a scalar operation corresponding to each of the set of operations, on each element of an input tensor. A scalar operation may refer to a process of performing a certain logical or mathematical operation on each element of an input matrix to produce a new matrix with the same number of rows and columns as those of the input matrix, while performing the operation on each element of the input original matrix is added to, subtracted from, multiplied by, or divided by the number. In an illustrated example, to perform a scalar multiplication to multiply a tensor of 2×3 dimension by 10, the resulting tensor would have a 2×3 dimension where each of the 6 elements equals the corresponding element of the input tensor multiplied by 10.

Additionally, the set of operations may include one or more input parameters of unspecified data types. In this case, the processing logic may utilize template metaprogramming to automatically determine a data type for each of the one or more parameters having unspecified data types. As an example, the processing logic can detect each data type for each parameter based on generating a temporary source code for the set of operations during compilation and utilize the detected data type of the parameters during execution time of the generated kernel executing the set of operations. In certain implementations, the temporary source code includes a set of lines of code that implement the mathematical expressions, such that when the lines of code are compiled, a compute kernel is generated. The compute kernel can then be executed at a device to execute the set of user-provided operations at the device.

At operation 230, the processing logic automatically generates, at the CPU of the computer system, the compute kernel that comprises the one or more operators representing the set of operations provided by the user. In an implementation, the processing logic generates the compute kernel by compiling the lines of code implementing the mathematical expressions that correspond to the set of operations. In one implementation, the processing logic compiles the lines of code to generate an executable program that includes the generated compute kernel. The executable program may refer to a binary that causes a computer to perform certain tasks and functionalities according to encoded instructions. The executable program may be an executable file, a statically linked library, a dynamically linked library, an applet, and/or other types of executable programs.

At operation 240, the processing logic transmits the generated kernel to a second processor such as a GPU of the computer system for execution. In some implementations, the executable program including the generated kernel is transmitted to the GPU. In this case, the processing logic at the second processor (e.g., GPU) may locate the kernel within the executable program and execute the kernel within the executable program (e.g., using a predetermined set of kernel application programming interfaces (API)s) at the second processor (e.g., GPU). In certain implementations, the processing logic may also transmit the generated kernel to a second processor (e.g., GPU or CPU) within a different computer system, as explained in more detail herein with respect to FIG. 3. At operation 250, the processing logic executes the compute kernel at the second processor (e.g., GPU), to execute the set of logical and mathematical operators and perform the set of user-provided operations on the elements of the input data structures.

Figure 3:
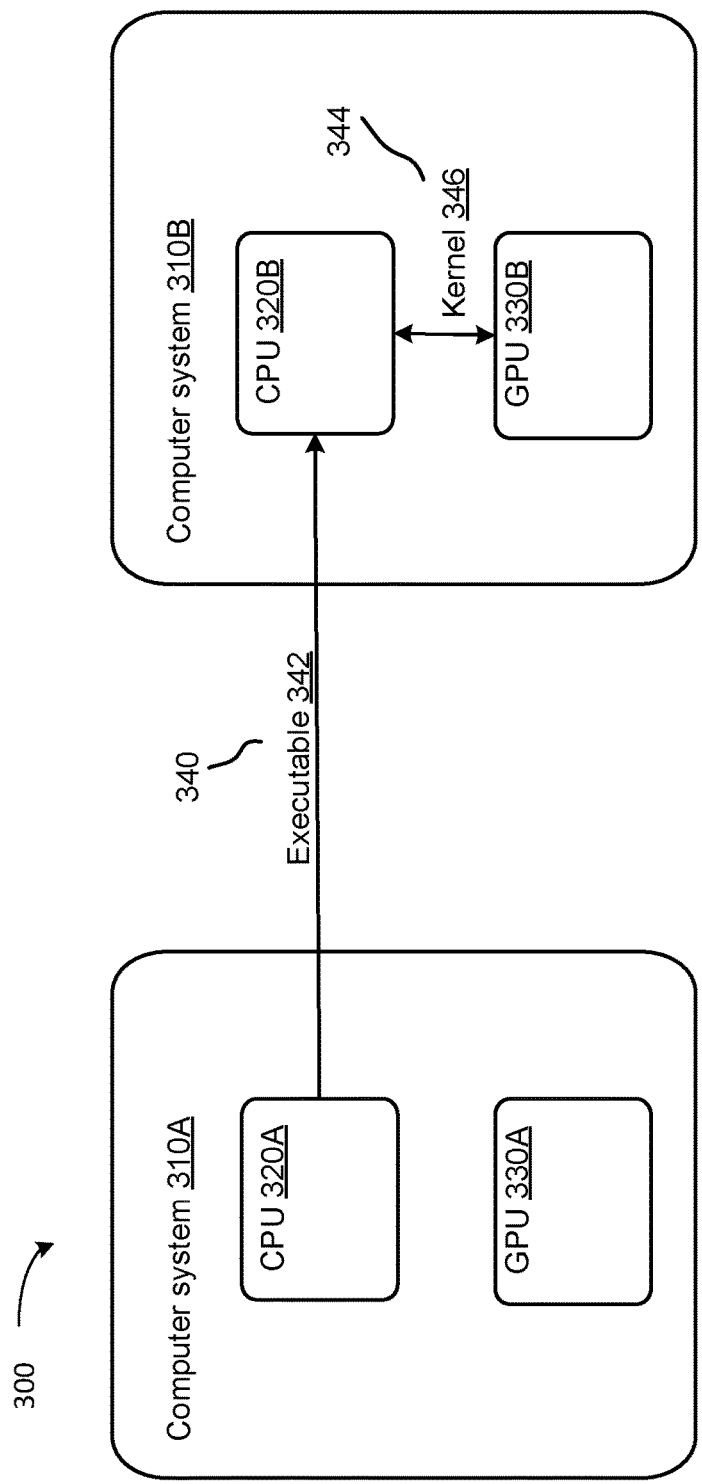
FIG. 3 is a diagram of computing environment for automatically generating and distributing a compute kernel that can be executed at a GPU, in accordance with at least one embodiment.

FIG. 3 is a diagram of computing environment 300 for automatically generating and distributing a compute kernel that can be executed at a GPU, in accordance with at least one embodiment. In at least one embodiment, a processing logic may automatically generate a compute kernel at a CPU for supporting various combinations of operators using operator overloading and template metaprogramming and delay execution of the kernel until deployment to a GPU. The combination of operators may perform one or more received operations, which may have been provided by a user in the form of user-supplied low level code (e.g., simple operators/mathematical expressions). Computer systems 310A-B may be the same or similar to server 110 of FIG. 1. In an implementation, computer systems 310 A-B may include, without limitation, a plurality of graphical processing units (GPUs) 330(A)-330(B), and/or central processing units (CPUs) 320(A)-320(B). In at least one embodiment, GPUs 330 and CPUs 320 may be interconnected with high-speed interconnects. Although one GPU 330 and one CPU 320 are illustrated in each computer system 310, this is not intended to be limiting. In at least one embodiment, each of computer system 310 may include, without limitation, any number of GPUs 330 and CPUs 320

In one implementation, CPU 320A of computer system 310 compiles and generates executable program 342 that includes compute kernel 346. At operation 340, CPU 320B of computer system 310B receives the compiled executable 342 from CPU 320A of computer system 310A, for executing kernel 346 within executable 342 at GPU 330B of computer system 310B. In an implementation, CPU 320A may generate kernel 346 during compilation of executable 342, such that kernel 346 can be executed at a GPU within the same computer system as CPU 320A or a different computer system. In certain implementations, kernel 346 may be used for performing one or more mathematical, logical, and/or other pointwise operations on tensors or other data types at GPU 330B, as defined by a user of GPU 330B wishing to perform a set of operations implemented by kernel 346 at GPU 330B. For performing the one or more operations, CPU 320A may automatically generate one or more operators using operator overloading and template metaprogramming, as explained in more details herein above. The one or more operators represent mathematical and/or logical expressions that can be used to carry out the set of operations provided by the user of GPU 330B.

At operation 344, CPU 320B transmits kernel 346 of executable 342 to GPU 330B for execution. In some implementations, GPU 330B may execute kernel 346 to perform the user provided set of operations at GPU 330B. as an example, GPU 330B may invoke a set of APIs within kernel 346 to perform the operations using one or more input tensors, such that the one or more operations are performed for each element of the input tensors. In an implementation, for each operation of the set of operations, GPU 330B can execute a corresponding scalar operation on each element of an input tensor, such that the output tensor after executing the scalar operations had the same dimension and rank as the corresponding input tensor but with elements of updated values according to the executed operations, as explained in more details herein in FIGS. 2 and 4.

FIG. 4 illustrates a set of operations for defining and executing a compute kernel for performing certain operations at a GPU, in accordance with at least one embodiment. In at least one embodiment, a user wishing to perform operations at a GPU may define the set of operations similar to (for example and without limitation) MATLAB operators or expressions for performing the desired operations. In one implementation, the user may utilize APIs provided by a software library implementing the functionality of the present disclosure, for defining the operations that will be carried out by a kernel. After defining the operations, the user may invoke one of a set of executor operators to execute the defined kernel at a GPU when the kernel is generated and transmitted to the GPU.

At operation 410, a user of the library defines an operation as follows:

auto op=set(*d*,abs(*a*\**b*+*c*)), where op operator performs the combined operations of abs (a*b+c) and assigns the output of the op operator to variable 'd'. In an implementation, a processing logic implementing the software library may utilize operator overloading and template metaprogramming to interpret and compile the user defined operator 'op'. In this case, the processing logic automatically breaks down abs (a*b+c) into an absolute operator, a multiplication operator, and an addition operator. Additionally, given that a, b, and c may be tensors of a certain dimension, the processing logic may use operator overloading to define each of operators absolute, addition, and multiplication on parameters of type tensor. In implementing operator overloading, the processing logic may determine the order of performing abs (a*b+c) based on the precedence of each operator as specified by the corresponding programming language. Accordingly, the processing logic may determine that the multiplication operators a*b may be performed first, followed by the addition operator of (a*b)+c, and finally performance of the absolute operator on the result of the addition operator. In addition to using operator overloading, the processing logic may use template metaprogramming to detect the system type of each of a, b, and c parameters of the op operator. In an implementation, the processing logic may use template metaprogramming during a compilation of the kernel to generate temporary source code. The temporary source code may then be merged by the compiler with the rest of the source code and compiled, such that the output of compiling these templates can include compile-time constants, data structures, as well as functions, as well as detected types of unspecified types of operator parameters. By compiling the temporary source code of the operation using template metaprogramming, the processing logic automatically assigns the detected data types to the corresponding parameter and utilize the detected data type of the parameters during execution time of the generated kernel.

At operation 420, the user of the library defines an executor operator as follows, to execute the defined operator op on a certain execution stream ("stream"):

matxExecuteOp(op,stream)

where matxExecuteOp is an executor operator that executes the kernel defined by the 'op' parameter and stream is a work queue where operator op can be executed. Multiple streams or work queues may be used concurrently to perform parallel work. In one implementation, stream can be a stream (e.g., a CUDA stream) at a GPU executing the kernel defined by operator op. In other implementations, the execute operator can also be executed at a work queue of a CPU of the computer system, thus executing the kernel at the CPU of the computer system.

Operation 430 represents the same functionality as the combined operations of 410 and 420. In this case, the user of the software library inputs a single function for defining and executing the compute kernel in one line using the following expression:

matxExecuteOp(set(*d*,abs(*a*\**b*+*c*),stream)

where matxExecuteOp is an executor operator that executes the kernel defined as set(d, abs(a*b+c) and stream is a standard stream where the kernel can be executed. In one implementation, stream can be a standard stream at a GPU executing the kernel defined by operator set(d, abs(a*b+c). In other implementations, the execute operator can also be executed at a standard stream of a CPU of the computer system, thus executing the kernel at the CPU of the computer system. In some implementations, a user may select to define the compute kernel using operator set(d, abs(a*b+c) and also execute the defined kernel at the stream inline using operation 430. The result of executing operation 430 is the same as executing the separate operations of 410 and 420 at a processor sequentially.

In embodiments, the executor operator (e.g., matx operator) is implemented using declarative programming as opposed to imperative programming. Imperative programming is a programming paradigm that uses statements that change a program's state. Imperative programming focuses on describing how a program operates (e.g., by explicitly listing commands and steps to be performed). Declarative programming is a non-imperative style of programming in which programs describe their results without explicitly listing commands or steps that are performed. The use of declarative programming with operator overloading performed at compile time enables a user to describe an operation to be performed using natural algebraic language, but does not define how the operation is executed or what libraries are to be used by the operation. This enables optimizations on aggregate expressions rather than on each individual component of a complex operation. The language used for expressions (e.g., in the defined operation) may not be fixed, and may expand over time. In at least one embodiment, processing logic optimizes a kernel based on architecture. In at least one embodiment, processing logic swaps backend libraries for the same interface based on inputs. For example, some libraries might be faster in certain situations than others for the same operation, and the selection of libraries to be used may be performed at compile time or at run time. In at least one embodiment, processing logic chains other operations in at compile time together with a provided operation. For example, processing logic may allow a fast Fourier transform (FFT) to be part of emitted code at compile time. A user could write an operation simply as A=C+FFT(B), which would cause code for performing a fast Fourier transform on B to be included in a kernel, increasing optimization opportunities.

Figure 5:
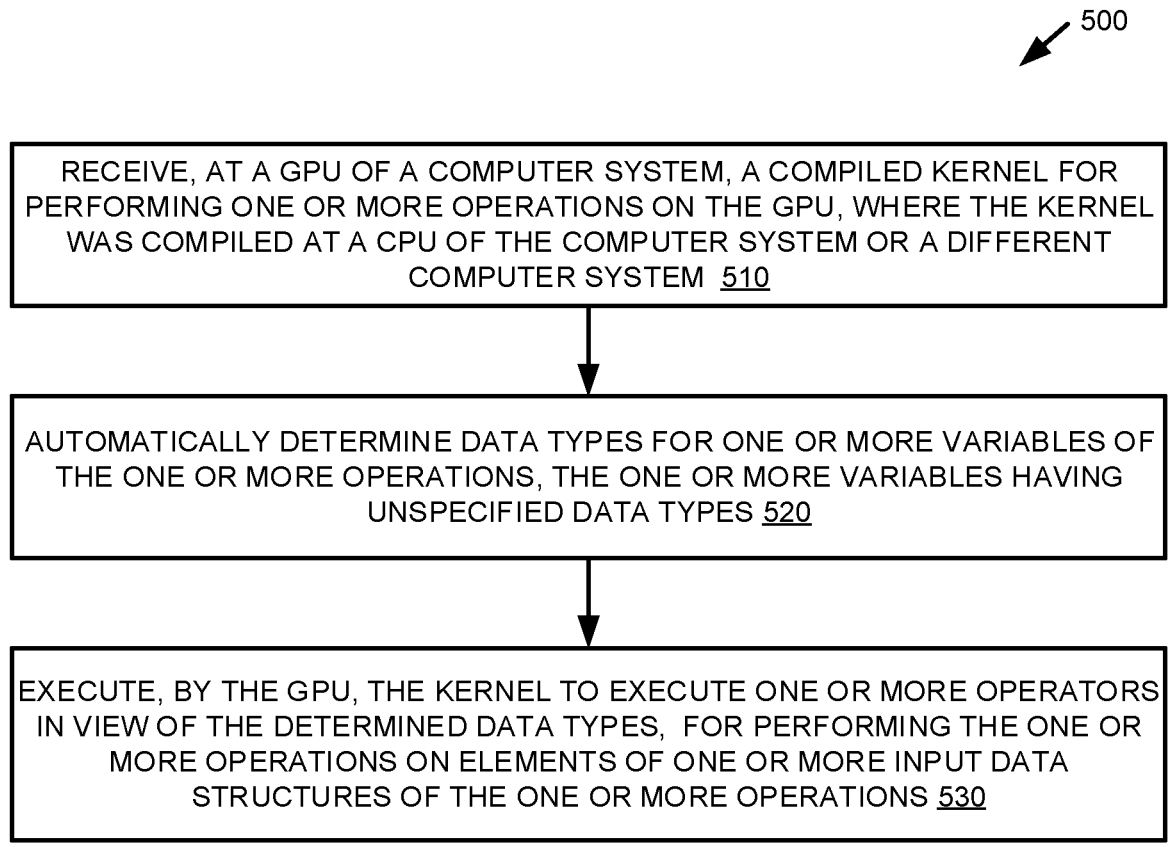
FIG. 5 is a flow diagram of a process for automatically detecting data types when generating a compute kernel to perform one or more operations at a processor of a computer system, in accordance with at least one embodiment.

FIG. 5 is a flow diagram of a process 500 for automatically detecting data types when generating a compute kernel to perform one or more operations at a processor of a computer system, in accordance with at least one embodiment. In at least one embodiment, a processing logic implementing process 500 may automatically generate, by a host CPU, a kernel for supporting various combinations of operators using techniques such as operator overloading and template metaprogramming. The combination of operators performs one or more operations provided by a user of the kernel in the form of user-supplied low level code (e.g., simple operators/mathematical expressions). When generating the combination of operators, the processing logic further detects and assigns data types to parameters of the operators that have unspecified data types. The generated kernel may then be executed on a device.

At operation 510, the processing logic receives, at a GPU of a computer system, a compiled kernel for performing one or more operations on the GPU, where the kernel was compiled at a CPU of the computer system or at a CPU of a different computer system. In one implementation, the one or more operations may be provided as lines of code from a user to be compiled at the CPU and then executed at the GPU. In certain implementations, the one or more operations have parameters of unspecified data types. The processing logic may then use template metaprogramming to detect data types for the unspecified data types of the provided parameters at runtime when executing the kernel at the GPU.

At operation 520, the processing logic automatically determines data types for one or more variables of the set of operations having unspecified data types. In certain implementations, the processing logic may identify parameters having unspecified data types during compilation of the set of operations and may use template metaprogramming to designate those parameters as template parameters, thus marking the parameters as "untyped" such that any one of a number of data types can be identified for the parameter at runtime. The processing logic, at runtime of the kernel at the GPU, may then detect a data type for each template parameter based on data assigned to the parameter during execution of the corresponding operation.

At operation 530, the processing logic may execute, by the GPU, the kernel to execute the set of operators based on the determined data types of the template parameters, such that each operator is performed on each element of a multi-dimensional tensor parameter of each operator. In certain implementations, the processing logic can perform an operator on each element of an input tensor by executing a scalar operation corresponding the operator, thus resulting in an output tensor having the same dimension as the input tensor while having an updated value for each element based on the executed scalar operation. In an illustrated example, if a data type of a certain parameter is determined to be a tensor of 3×3 dimensions and the operator is an addition operator of parameter tensor and 5 (e.g., operator=T+5), the processing logic may perform a scalar addition to add 5 to each element of tensor T. In this case, the processing logic may generate a 3×3 output tensor such that each of the 9 elements of the output tensor would be equal to the corresponding element of the input tensor T plus 5. The processing logic may then repeat the scalar operation execution for each operator in the set of operators of the kernel.

Data Center

Figure 6:
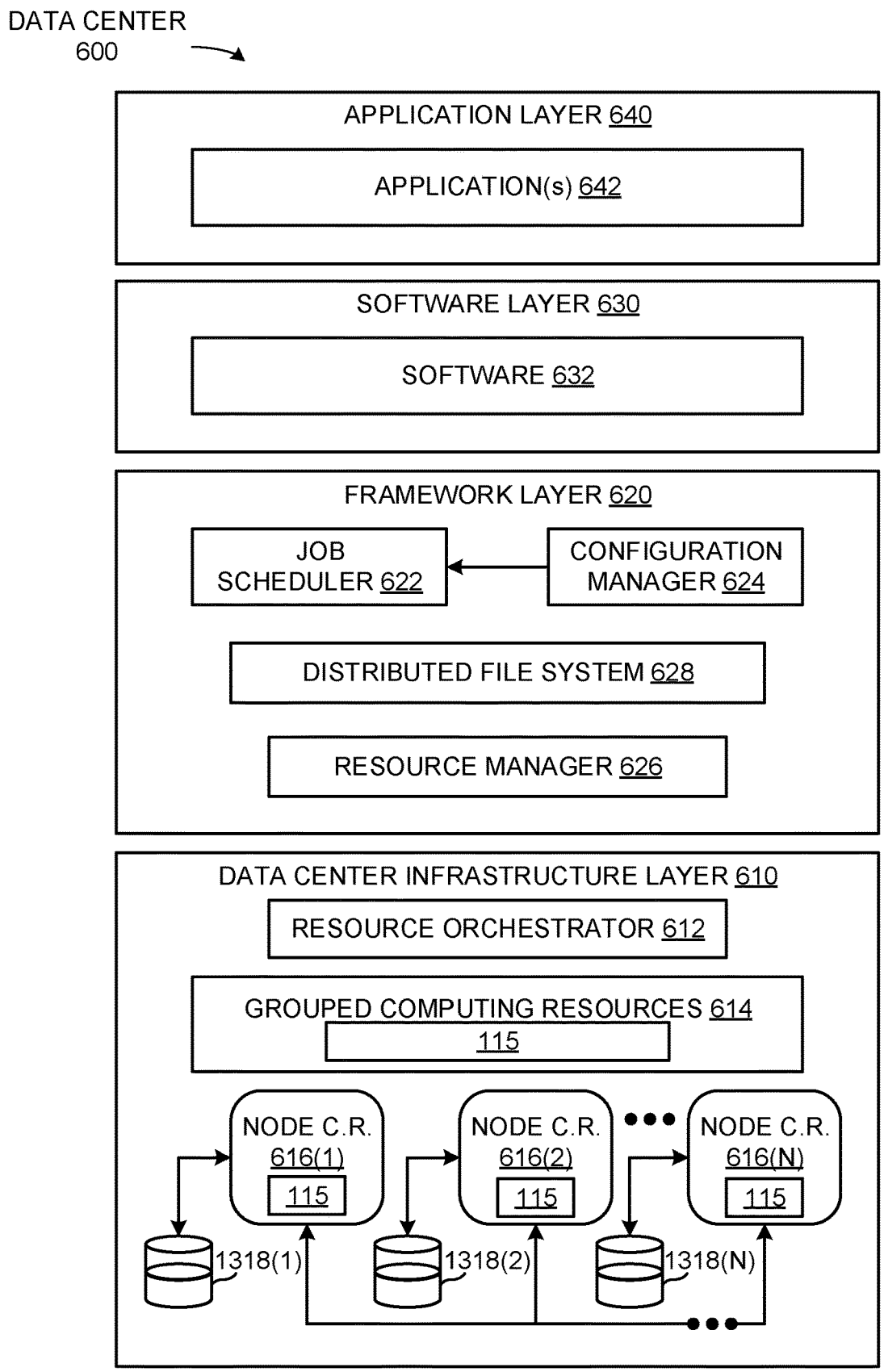
FIG. 6 illustrates an example data center, in which at least one embodiment may be used.

FIG. 6 illustrates an example data center 600, in which at least one embodiment may be used. In at least one embodiment, data center 600 includes a data center infrastructure layer 610, a framework layer 620, a software layer 630 and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents a positive integer (which may be a different integer "N" than used in other figures). In at least one embodiment, node C.R.s 616(1)-616(N) may include, but are not limited to, any number of central processing units ("CPUs") or other processors (including accelerators, field programmable gate arrays (FPGAs), graphics processors, etc.), memory storage devices 618(1)-618(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). In at least one embodiment, separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator 112 may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resources 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. In at least one embodiment, one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center 600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Kernel generation component 115 may be used to automatically generate compute kernels to perform operations associated with one or more embodiments. Details regarding kernel generation component 115 are provided herein in conjunction with FIG. 1. In at least one embodiment, kernel generation component 115 may be used in FIG. 6 for executing operators based, at least in part, on user provided mathematical and/or logical operations as described herein.

Autonomous Vehicle

Figure 7A:
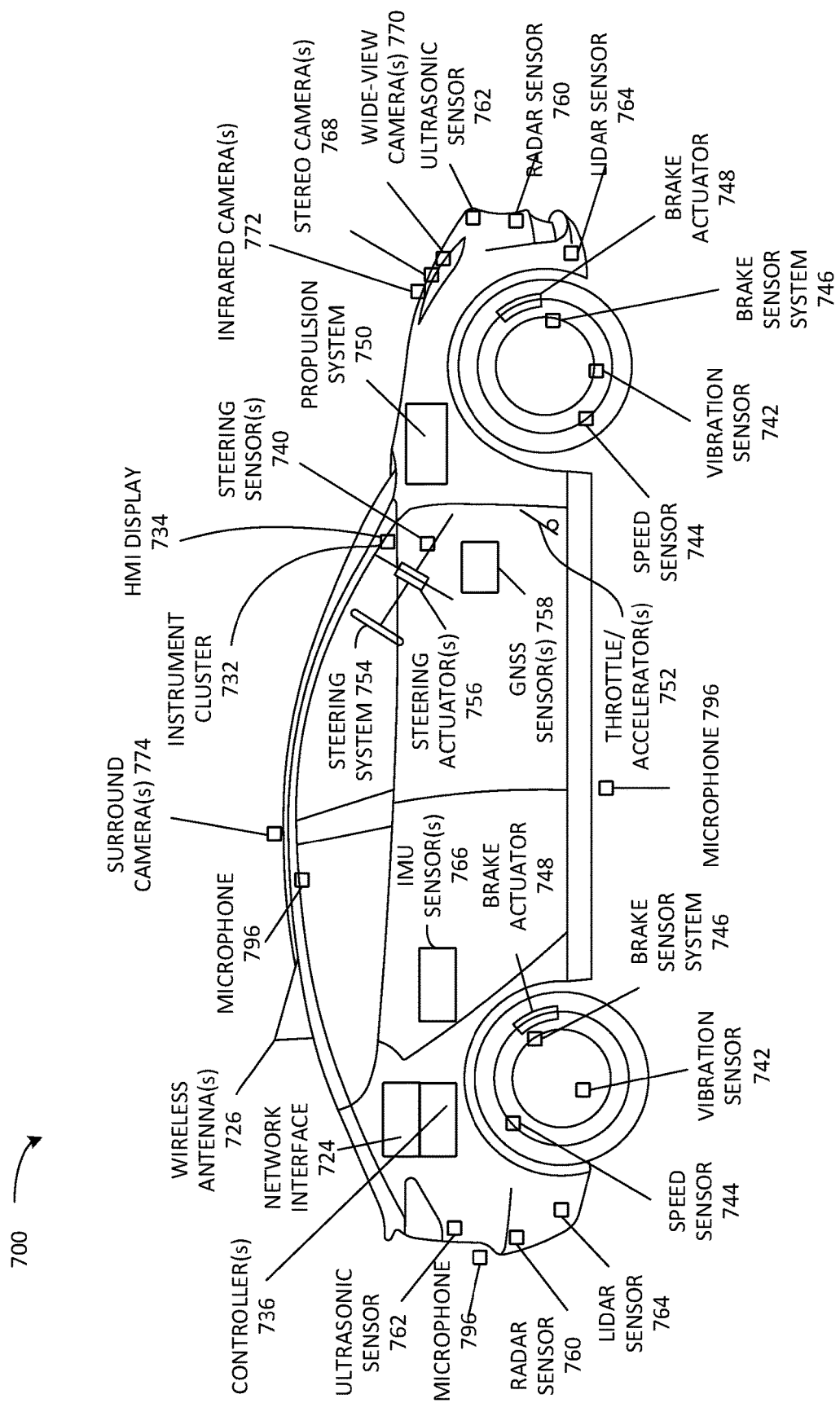
FIG. 7A illustrates an example of an autonomous vehicle, according to at least one embodiment.
Figure 7:
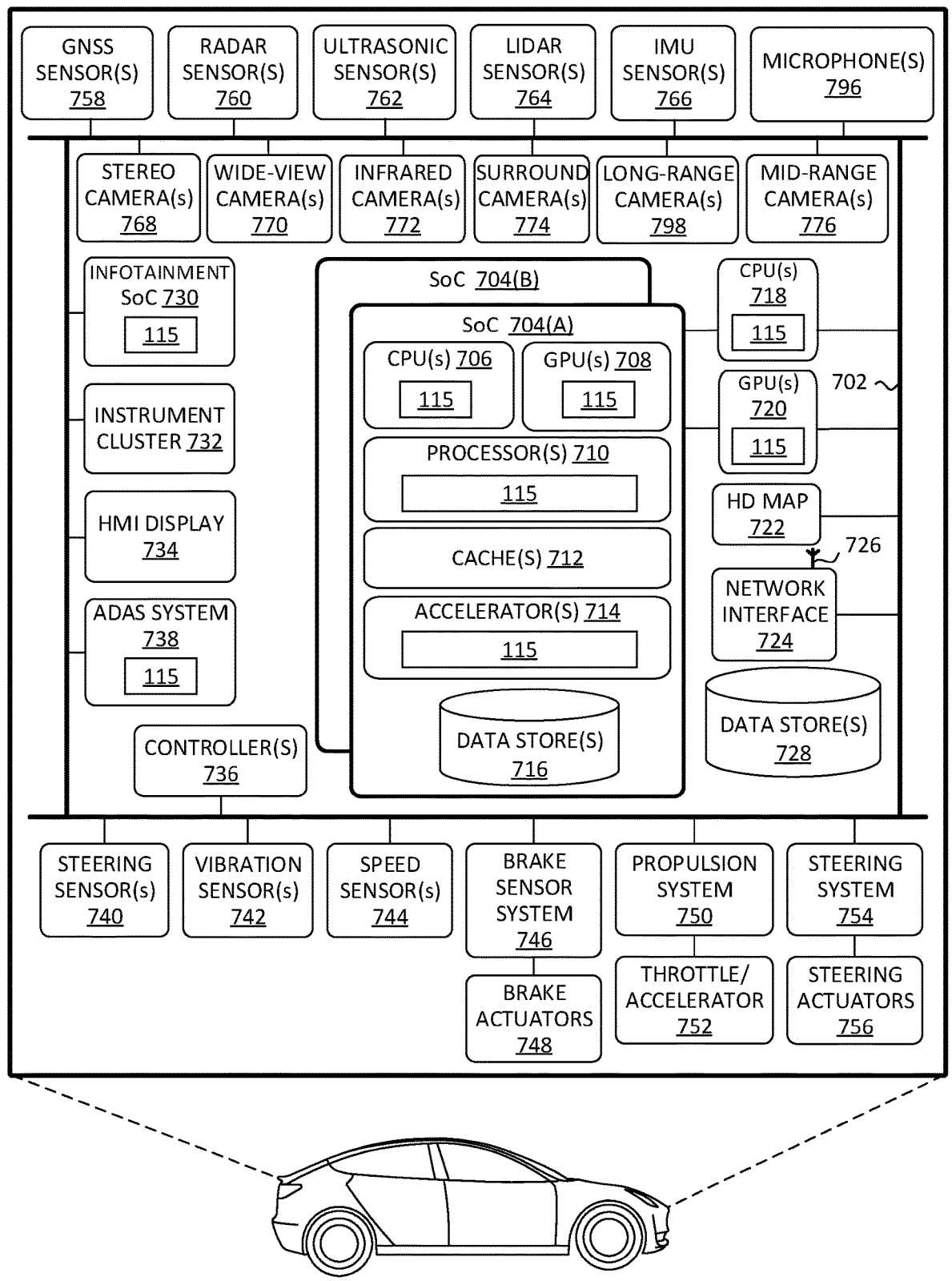
FIG. 7B is a block diagram illustrating an example system architecture for the autonomous vehicle of FIG. 7A, according to at least one embodiment.

FIG. 7A illustrates an example of an autonomous vehicle 700, according to at least one embodiment. In at least one embodiment, autonomous vehicle 700 (alternatively referred to herein as "vehicle 700") may be, without limitation, a passenger vehicle, such as a car, a truck, a bus, and/or another type of vehicle that accommodates one or more passengers. In at least one embodiment, vehicle 700 may be a semi-tractor-trailer truck used for hauling cargo. In at least one embodiment, vehicle 700 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 700 may be capable of functionality in accordance with one or more of Level 1 through Level 5 of autonomous driving levels. For example, in at least one embodiment, vehicle 700 may be capable of conditional automation (Level 3), high automation (Level 4), and/or full automation (Level 5), depending on embodiment.

In at least one embodiment, vehicle 700 may include, without limitation, components such as a chassis, a vehicle body, wheels (e.g., 2, 4, 6, 8, 18, etc.), tires, axles, and other components of a vehicle. In at least one embodiment, vehicle 700 may include, without limitation, a propulsion system 750, such as an internal combustion engine, hybrid electric power plant, an all-electric engine, and/or another propulsion system type. In at least one embodiment, propulsion system 750 may be connected to a drive train of vehicle 700, which may include, without limitation, a transmission, to enable propulsion of vehicle 700. In at least one embodiment, propulsion system 750 may be controlled in response to receiving signals from a throttle/accelerator(s) 752.

In at least one embodiment, a steering system 754, which may include, without limitation, a steering wheel, is used to steer vehicle 700 (e.g., along a desired path or route) when propulsion system 750 is operating (e.g., when vehicle 700 is in motion). In at least one embodiment, steering system 754 may receive signals from steering actuator(s) 756. In at least one embodiment, a steering wheel may be optional for full automation (Level 5) functionality. In at least one embodiment, a brake sensor system 746 may be used to operate vehicle brakes in response to receiving signals from brake actuator(s) 748 and/or brake sensors.

In at least one embodiment, controller(s) 736, which may include, without limitation, one or more system on chips ("SoCs") (not shown in FIG. 7A) and/or graphics processing unit(s) ("GPU(s)"), provide signals (e.g., representative of commands) to one or more components and/or systems of vehicle 700. For instance, in at least one embodiment, controller(s) 736 may send signals to operate vehicle brakes via brake actuator(s) 748, to operate steering system 754 via steering actuator(s) 756, to operate propulsion system 750 via throttle/accelerator(s) 752. In at least one embodiment, controller(s) 736 may include one or more onboard (e.g., integrated) computing devices that process sensor signals, and output operation commands (e.g., signals representing commands) to enable autonomous driving and/or to assist a human driver in driving vehicle 700. In at least one embodiment, controller(s) 736 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 736 provide signals for controlling one or more components and/or systems of vehicle 700 in response to sensor data received from one or more sensors (e.g., sensor inputs). In at least one embodiment, sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit ("IMU") sensor(s) 766 (e.g., accelerometer(s), gyroscope(s), a magnetic compass or magnetic compasses, magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range cameras (not shown in FIG. 7A), mid-range camera(s) (not shown in FIG. 7A), speed sensor(s) 744 (e.g., for measuring speed of vehicle 700), vibration sensor(s) 742, steering sensor(s) 740, brake sensor(s) (e.g., as part of brake sensor system 746), and/or other sensor types.

In at least one embodiment, one or more of controller(s) 736 may receive inputs (e.g., represented by input data) from an instrument cluster 732 of vehicle 700 and provide outputs (e.g., represented by output data, display data, etc.) via a human-machine interface ("HMI") display 734, an audible annunciator, a loudspeaker, and/or via other components of vehicle 700. In at least one embodiment, outputs may include information such as vehicle velocity, speed, time, map data (e.g., a High Definition map (not shown in FIG. 7A), location data (e.g., vehicle's 700 location, such as on a map), direction, location of other vehicles (e.g., an occupancy grid), information about objects and status of objects as perceived by controller(s) 736, etc. For example, in at least one embodiment, HMI display 734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 700 further includes a network interface 724 which may use wireless antenna(s) 726 and/or modem(s) to communicate over one or more networks. For example, in at least one embodiment, network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

An application that include a kernel that was automatically generated using kernel generation components 115 may be used to execute the kernel to perform operations associated with one or more embodiments. Such automatically generated kernels may be executed on a processor of the vehicle 700, such as on a GPU or accelerator of vehicle 700. Details regarding kernel generation component 115 are provided herein in conjunction with FIG. 1. In at least one embodiment, kernel generation component 115 may be used in system FIG. 7A for executing operators based, at least in part, on user provided mathematical and/or logical operations as described herein.

FIG. 7B is a block diagram illustrating an example system architecture for autonomous vehicle 700 of FIG. 7A, according to at least one embodiment. In at least one embodiment, each of components, features, and systems of vehicle 700 in FIG. 7B is illustrated as being connected via a bus 702. In at least one embodiment, bus 702 may include, without limitation, a CAN data interface (alternatively referred to herein as a "CAN bus"). In at least one embodiment, a CAN may be a network inside vehicle 700 used to aid in control of various features and functionality of vehicle 700, such as actuation of brakes, acceleration, braking, steering, windshield wipers, etc. In at least one embodiment, bus 702 may be configured to have dozens or even hundreds of nodes, each with its own unique identifier (e.g., a CAN ID). In at least one embodiment, bus 702 may be read to find steering wheel angle, ground speed, engine revolutions per minute ("RPMs"), button positions, and/or other vehicle status indicators. In at least one embodiment, bus 702 may be a CAN bus that is ASIL B compliant.

In at least one embodiment, in addition to, or alternatively from CAN, FlexRay and/or Ethernet protocols may be used. In at least one embodiment, there may be any number of busses forming bus 702, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 702 may communicate with any of components of vehicle 700, and two or more busses of bus 702 may communicate with corresponding components. In at least one embodiment, each of any number of system(s) on chip(s) ("SoC(s)") 704 (such as SoC 704(A) and SoC 704(B), each of controller(s) 736, and/or each computer within vehicle may have access to same input data (e.g., inputs from sensors of vehicle 700), and may be connected to a common bus, such CAN bus.

In at least one embodiment, vehicle 700 may include one or more controller(s) 736, such as those described herein with respect to FIG. 7A. In at least one embodiment, controller(s) 736 may be used for a variety of functions. In at least one embodiment, controller(s) 736 may be coupled to any of various other components and systems of vehicle 700, and may be used for control of vehicle 700, artificial intelligence of vehicle 700, infotainment for vehicle 700, and/or other functions.

In at least one embodiment, vehicle 700 may include any number of SoCs 704. In at least one embodiment, each of SoCs 704 may include, without limitation, central processing units ("CPU(s)") 706, graphics processing units ("GPU(s)") 708, processor(s) 710, cache(s) 712, accelerator(s) 714, data store(s) 716, and/or other components and features not illustrated. In at least one embodiment, SoC(s) 704 may be used to control vehicle 700 in a variety of platforms and systems. For example, in at least one embodiment, SoC(s) 704 may be combined in a system (e.g., system of vehicle 700) with a High Definition ("HD") map 722 which may obtain map refreshes and/or updates via network interface 724 from one or more servers (not shown in FIG. 7B).

In at least one embodiment, CPU(s) 706 may include a CPU cluster or CPU complex (alternatively referred to herein as a "CCPLEX"). In at least one embodiment, CPU(s) 706 may include multiple cores and/or level two ("L2") caches. For instance, in at least one embodiment, CPU(s) 706 may include eight cores in a coherent multi-processor configuration. In at least one embodiment, CPU(s) 706 may include four dual-core clusters where each cluster has a dedicated L2 cache (e.g., a 2 megabyte (MB) L2 cache). In at least one embodiment, CPU(s) 706 (e.g., CCPLEX) may be configured to support simultaneous cluster operations enabling any combination of clusters of CPU(s) 706 to be active at any given time.

In at least one embodiment, one or more of CPU(s) 706 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 706 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 708 may include an integrated GPU (alternatively referred to herein as an "iGPU"). In at least one embodiment, GPU(s) 708 may be programmable and may be efficient for parallel workloads. In at least one embodiment, GPU(s) 708 may use an enhanced tensor instruction set. In at least one embodiment, GPU(s) 708 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 708 may include at least eight streaming microprocessors. In at least one embodiment, GPU(s) 708 may use compute application programming interface(s) (API(s)). In at least one embodiment, GPU(s) 708 may use one or more parallel computing platforms and/or programming models (e.g., NVIDIA's CUDA model).

In at least one embodiment, one or more of GPU(s) 708 may be power-optimized for best performance in automotive and embedded use cases. For example, in at least one embodiment, GPU(s) 708 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 708 may include a high bandwidth memory ("HBM") and/or a 16 GB high-bandwidth memory second generation ("HBM2") memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 708 may include unified memory technology. In at least one embodiment, address translation services ("ATS") support may be used to allow GPU(s) 708 to access CPU(s) 706 page tables directly. In at least one embodiment, embodiment, when a GPU of GPU(s) 708 memory management unit ("MMU") experiences a miss, an address translation request may be transmitted to CPU(s) 706. In response, 2 CPU of CPU(s) 706 may look in its page tables for a virtual-to-physical mapping for an address and transmit translation back to GPU(s) 708, in at least one embodiment. In at least one embodiment, unified memory technology may allow a single unified virtual address space for memory of both CPU(s) 706 and GPU(s) 708, thereby simplifying GPU(s) 708 programming and porting of applications to GPU(s) 708.

In at least one embodiment, GPU(s) 708 may include any number of access counters that may keep track of frequency of access of GPU(s) 708 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 704 may include any number of cache(s) 712, including those described herein. For example, in at least one embodiment, cache(s) 712 could include a level three ("L3") cache that is available to both CPU(s) 706 and GPU(s) 708 (e.g., that is connected to CPU(s) 706 and GPU(s) 708). In at least one embodiment, cache(s) 712 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 704 may include one or more accelerator(s) 714 (e.g., hardware accelerators, software accelerators, or a combination thereof). In at least one embodiment, SoC(s) 704 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 708 and to off-load some of tasks of GPU(s) 708 (e.g., to free up more cycles of GPU(s) 708 for performing other tasks). In at least one embodiment, accelerator(s) 714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 714 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 708, and by using an inference accelerator, for example, a designer may target either DLA(s) or GPU(s) 708 for any function. For example, in at least one embodiment, a designer may focus processing of CNNs and floating point operations on DLA(s) and leave other functions to GPU(s) 708 and/or accelerator(s) 714.

In at least one embodiment, accelerator(s) 714 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 738, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 706. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 714 may include a computer vision network on-chip and static random-access memory ("SRAM"), for providing a high-bandwidth, low latency SRAM for accelerator(s) 714. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 714 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 700, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 766 that correlates with vehicle 700 orientation, distance, 3D location estimates of object obtained from neural network and/or other sensors (e.g., LIDAR sensor(s) 764 or RADAR sensor(s) 760), among others.

In at least one embodiment, one or more of SoC(s) 704 may include data store(s) 716 (e.g., memory). In at least one embodiment, data store(s) 716 may be on-chip memory of SoC(s) 704, which may store neural networks to be executed on GPU(s) 708 and/or a DLA. In at least one embodiment, data store(s) 716 may be large enough in capacity to store multiple instances of neural networks for redundancy and safety. In at least one embodiment, data store(s) 716 may comprise L2 or L3 cache(s).

In at least one embodiment, one or more of SoC(s) 704 may include any number of processor(s) 710 (e.g., embedded processors). In at least one embodiment, processor(s) 710 may include a boot and power management processor that may be a dedicated processor and subsystem to handle boot power and management functions and related security enforcement. In at least one embodiment, a boot and power management processor may be a part of a boot sequence of SoC(s) 704 and may provide runtime power management services. In at least one embodiment, a boot power and management processor may provide clock and voltage programming, assistance in system low power state transitions, management of SoC(s) 704 thermals and temperature sensors, and/or management of SoC(s) 704 power states. In at least one embodiment, each temperature sensor may be implemented as a ring-oscillator whose output frequency is proportional to temperature, and SoC(s) 704 may use ring-oscillators to detect temperatures of CPU(s) 706, GPU(s) 708, and/or accelerator(s) 714. In at least one embodiment, if temperatures are determined to exceed a threshold, then a boot and power management processor may enter a temperature fault routine and put SoC(s) 704 into a lower power state and/or put vehicle 700 into a chauffeur to safe stop mode (e.g., bring vehicle 700 to a safe stop).

In at least one embodiment, processor(s) 710 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 710 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 710 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 710 may further include a real-time camera engine that may include, without limitation, a dedicated processor subsystem for handling real-time camera management. In at least one embodiment, processor(s) 710 may further include a high-dynamic range signal processor that may include, without limitation, an image signal processor that is a hardware engine that is part of a camera processing pipeline.

In at least one embodiment, processor(s) 710 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 770, surround camera(s) 774, and/or on in-cabin monitoring camera sensor(s). In at least one embodiment, in-cabin monitoring camera sensor(s) are preferably monitored by a neural network running on another instance of SoC 704, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 708 are not required to continuously render new surfaces. In at least one embodiment, when GPU(s) 708 are powered on and active doing 3D rendering, a video image compositor may be used to offload GPU(s) 708 to improve performance and responsiveness.

In at least one embodiment, one or more SoC of SoC(s) 704 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 704 may further include an input/output controller(s) that may be controlled by software and may be used for receiving I/O signals that are uncommitted to a specific role.

In at least one embodiment, one or more of SoC(s) 704 may further include a broad range of peripheral interfaces to enable communication with peripherals, audio encoders/decoders ("codecs"), power management, and/or other devices. In at least one embodiment, SoC(s) 704 may be used to process data from cameras (e.g., connected over Gigabit Multimedia Serial Link and Ethernet channels), sensors (e.g., LIDAR sensor(s) 764, RADAR sensor(s) 760, etc. that may be connected over Ethernet channels), data from bus 702 (e.g., speed of vehicle 700, steering wheel position, etc.), data from GNSS sensor(s) 758 (e.g., connected over a Ethernet bus or a CAN bus), etc. In at least one embodiment, one or more SoC of SoC(s) 704 may further include dedicated high-performance mass storage controllers that may include their own DMA engines, and that may be used to free CPU(s) 706 from routine data management tasks.

In at least one embodiment, SoC(s) 704 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 704 may be faster, more reliable, and even more energy-efficient and space-efficient than conventional systems. For example, in at least one embodiment, accelerator(s) 714, when combined with CPU(s) 706, GPU(s) 708, and data store(s) 716, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 720) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 708.

In at least one embodiment, a CNN for facial recognition and vehicle owner identification may use data from camera sensors to identify presence of an authorized driver and/or owner of vehicle 700. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 704 provide for security against theft and/or carjacking.

In at least one embodiment, a CNN for emergency vehicle detection and identification may use data from microphones 796 to detect and identify emergency vehicle sirens. In at least one embodiment, SoC(s) 704 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 758. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 762, until emergency vehicles pass.

In at least one embodiment, vehicle 700 may include CPU(s) 718 (e.g., discrete CPU(s), or dCPU(s)), that may be coupled to SoC(s) 704 via a high-speed interconnect (e.g., PCIe). In at least one embodiment, CPU(s) 718 may include an X86 processor, for example. CPU(s) 718 may be used to perform any of a variety of functions, including arbitrating potentially inconsistent results between ADAS sensors and SoC(s) 704, and/or monitoring status and health of controller(s) 736 and/or an infotainment system on a chip ("infotainment SoC") 730, for example.

In at least one embodiment, vehicle 700 may include GPU(s) 720 (e.g., discrete GPU(s), or dGPU(s)), that may be coupled to SoC(s) 704 via a high-speed interconnect (e.g., NVIDIA's NVLINK channel). In at least one embodiment, GPU(s) 720 may provide additional artificial intelligence functionality, such as by executing redundant and/or different neural networks, and may be used to train and/or update neural networks based at least in part on input (e.g., sensor data) from sensors of a vehicle 700.

In at least one embodiment, vehicle 700 may further include network interface 724 which may include, without limitation, wireless antenna(s) 726 (e.g., one or more wireless antennas for different communication protocols, such as a cellular antenna, a Bluetooth antenna, etc.). In at least one embodiment, network interface 724 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 700 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 700 information about vehicles in proximity to vehicle 700 (e.g., vehicles in front of, on a side of, and/or behind vehicle 700). In at least one embodiment, such aforementioned functionality may be part of a cooperative adaptive cruise control functionality of vehicle 700.

In at least one embodiment, network interface 724 may include an SoC that provides modulation and demodulation functionality and enables controller(s) 736 to communicate over wireless networks. In at least one embodiment, network interface 724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 700 may further include data store(s) 728 which may include, without limitation, off-chip (e.g., off SoC(s) 704) storage. In at least one embodiment, data store(s) 728 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 700 may further include GNSS sensor(s) 758 (e.g., GPS and/or assisted GPS sensors), to assist in mapping, perception, occupancy grid generation, and/or path planning functions. In at least one embodiment, any number of GNSS sensor(s) 758 may be used, including, for example and without limitation, a GPS using a Universal Serial Bus ("USB") connector with an Ethernet-to-Serial (e.g., RS-232) bridge.

In at least one embodiment, vehicle 700 may further include RADAR sensor(s) 760. In at least one embodiment, RADAR sensor(s) 760 may be used by vehicle 700 for long-range vehicle detection, even in darkness and/or severe weather conditions. In at least one embodiment, RADAR functional safety levels may be ASIL B. In at least one embodiment, RADAR sensor(s) 760 may use a CAN bus and/or bus 702 (e.g., to transmit data generated by RADAR sensor(s) 760) for control and to access object tracking data, with access to Ethernet channels to access raw data in some examples. In at least one embodiment, a wide variety of RADAR sensor types may be used. For example, and without limitation, RADAR sensor(s) 760 may be suitable for front, rear, and side RADAR use. In at least one embodiment, one or more sensor of RADAR sensors(s) 760 is a Pulse Doppler RADAR sensor.

In at least one embodiment, RADAR sensor(s) 760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 760 may help in distinguishing between static and moving objects, and may be used by ADAS system 738 for emergency brake assist and forward collision warning. In at least one embodiment, sensors 760(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 700 surroundings at higher speeds with minimal interference from traffic in adjacent lanes. In at least one embodiment, another two antennae may expand field of view, making it possible to quickly detect vehicles entering or leaving a lane of vehicle 700.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 760 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 738 for blind spot detection and/or lane change assist.

In at least one embodiment, vehicle 700 may further include ultrasonic sensor(s) 762. In at least one embodiment, ultrasonic sensor(s) 762, which may be positioned at a front, a back, and/or side location of vehicle 700, may be used for parking assist and/or to create and update an occupancy grid. In at least one embodiment, a wide variety of ultrasonic sensor(s) 762 may be used, and different ultrasonic sensor(s) 762 may be used for different ranges of detection (e.g., 2.5 m, 4 m). In at least one embodiment, ultrasonic sensor(s) 762 may operate at functional safety levels of ASIL B.

In at least one embodiment, vehicle 700 may include LIDAR sensor(s) 764. In at least one embodiment, LIDAR sensor(s) 764 may be used for object and pedestrian detection, emergency braking, collision avoidance, and/or other functions. In at least one embodiment, LIDAR sensor(s) 764 may operate at functional safety level ASIL B. In at least one embodiment, vehicle 700 may include multiple LIDAR sensors 764 (e.g., two, four, six, etc.) that may use an Ethernet channel (e.g., to provide data to a Gigabit Ethernet switch).

In at least one embodiment, LIDAR sensor(s) 764 may be capable of providing a list of objects and their distances for a 360-degree field of view. In at least one embodiment, commercially available LIDAR sensor(s) 764 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 764 may include a small device that may be embedded into a front, a rear, a side, and/or a corner location of vehicle 700. In at least one embodiment, LIDAR sensor(s) 764, in such an embodiment, may provide up to a 120-degree horizontal and 35-degree vertical field-of-view, with a 200 m range even for low-reflectivity objects. In at least one embodiment, front-mounted LIDAR sensor(s) 764 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 700 up to approximately 200 m. In at least one embodiment, a flash LIDAR unit includes, without limitation, a receptor, which records laser pulse transit time and reflected light on each pixel, which in turn corresponds to a range from vehicle 700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 700 may further include IMU sensor(s) 766. In at least one embodiment, IMU sensor(s) 766 may be located at a center of a rear axle of vehicle 700. In at least one embodiment, IMU sensor(s) 766 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 766 may include, without limitation, accelerometers and gyroscopes. In at least one embodiment, such as in nine-axis applications, IMU sensor(s) 766 may include, without limitation, accelerometers, gyroscopes, and magnetometers.

In at least one embodiment, IMU sensor(s) 766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 766 may enable vehicle 700 to estimate its heading without requiring input from a magnetic sensor by directly observing and correlating changes in velocity from a GPS to IMU sensor(s) 766. In at least one embodiment, IMU sensor(s) 766 and GNSS sensor(s) 758 may be combined in a single integrated unit.

In at least one embodiment, vehicle 700 may include microphone(s) 796 placed in and/or around vehicle 700. In at least one embodiment, microphone(s) 796 may be used for emergency vehicle detection and identification, among other things.

In at least one embodiment, vehicle 700 may further include any number of camera types, including stereo camera(s) 768, wide-view camera(s) 770, infrared camera(s) 772, surround camera(s) 774, long-range camera(s) 798, mid-range camera(s) 776, and/or other camera types. In at least one embodiment, cameras may be used to capture image data around an entire periphery of vehicle 700. In at least one embodiment, which types of cameras used depends on vehicle 700. In at least one embodiment, any combination of camera types may be used to provide necessary coverage around vehicle 700. In at least one embodiment, a number of cameras deployed may differ depending on embodiment.

For example, in at least one embodiment, vehicle 700 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 7A.

In at least one embodiment, vehicle 700 may further include vibration sensor(s) 742. In at least one embodiment, vibration sensor(s) 742 may measure vibrations of components of vehicle 700, such as axle(s). For example, in at least one embodiment, changes in vibrations may indicate a change in road surfaces. In at least one embodiment, when two or more vibration sensors 742 are used, differences between vibrations may be used to determine friction or slippage of road surface (e.g., when a difference in vibration is between a power-driven axle and a freely rotating axle).

In at least one embodiment, vehicle 700 may include ADAS system 738. In at least one embodiment, ADAS system 738 may include, without limitation, an SoC, in some examples. In at least one embodiment, ADAS system 738 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 760, LIDAR sensor(s) 764, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 700 and automatically adjusts speed of vehicle 700 to maintain a safe distance from vehicles ahead. In at least one embodiment, a lateral ACC system performs distance keeping, and advises vehicle 700 to change lanes when necessary. In at least one embodiment, a lateral ACC is related to other ADAS applications, such as LC and CW.

In at least one embodiment, a CACC system uses information from other vehicles that may be received via network interface 724 and/or wireless antenna(s) 726 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 700), while I2V communication provides information about traffic further ahead. In at least one embodiment, a CACC system may include either or both I2V and V2V information sources. In at least one embodiment, given information of vehicles ahead of vehicle 700, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 760, coupled to a dedicated processor, digital signal processor ("DSP"), FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 760, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 700 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 700 if vehicle 700 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 700 is backing up. In at least one embodiment, an RCTW system includes an AEB system to ensure that vehicle brakes are applied to avoid a crash. In at least one embodiment, an RCTW system may use one or more rear-facing RADAR sensor(s) 760, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 700 itself decides, in case of conflicting results, whether to heed result from a primary computer or a secondary computer (e.g., a first controller or a second controller of controllers 736). For example, in at least one embodiment, ADAS system 738 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 738 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 704.

In at least one embodiment, ADAS system 738 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 738 may be fed into a primary computer's perception block and/or a primary computer's dynamic driving task block. For example, in at least one embodiment, if ADAS system 738 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 700 may further include infotainment SoC 730 (e.g., an in-vehicle infotainment system (IVI)). Although illustrated and described as an SoC, infotainment system SoC 730, in at least one embodiment, may not be an SoC, and may include, without limitation, two or more discrete components. In at least one embodiment, infotainment SoC 730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 700. For example, infotainment SoC 730 could include radios, disk players, navigation systems, video players, USB and Bluetooth connectivity, carputers, in-car entertainment, WiFi, steering wheel audio controls, hands free voice control, a heads-up display ("HUD"), HMI display 734, a telematics device, a control panel (e.g., for controlling and/or interacting with various components, features, and/or systems), and/or other components. In at least one embodiment, infotainment SoC 730 may further be used to provide information (e.g., visual and/or audible) to user(s) of vehicle 700, such as information from ADAS system 738, autonomous driving information such as planned vehicle maneuvers, trajectories, surrounding environment information (e.g., intersection information, vehicle information, road information, etc.), and/or other information.

In at least one embodiment, infotainment SoC 730 may include any amount and type of GPU functionality. In at least one embodiment, infotainment SoC 730 may communicate over bus 702 with other devices, systems, and/or components of vehicle 700. In at least one embodiment, infotainment SoC 730 may be coupled to a supervisory MCU such that a GPU of an infotainment system may perform some self-driving functions in event that primary controller(s) 736 (e.g., primary and/or backup computers of vehicle 700) fail. In at least one embodiment, infotainment SoC 730 may put vehicle 700 into a chauffeur to safe stop mode, as described herein.

In at least one embodiment, vehicle 700 may further include instrument cluster 732 (e.g., a digital dash, an electronic instrument cluster, a digital instrument panel, etc.). In at least one embodiment, instrument cluster 732 may include, without limitation, a controller and/or supercomputer (e.g., a discrete controller or supercomputer). In at least one embodiment, instrument cluster 732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 730 and instrument cluster 732. In at least one embodiment, instrument cluster 732 may be included as part of infotainment SoC 730, or vice versa.

An application that include a kernel that was automatically generated using kernel generation components 115 may be used to execute the kernel to perform operations associated with one or more embodiments. Such automatically generated kernels may be executed on a processor of the vehicle 700, such as on a GPU or accelerator of vehicle 700. Details regarding kernel generation component 115 are provided herein in conjunction with FIG. 1. In at least one embodiment, kernel generation component 115 may be used in system FIG. 7B for executing operators based, at least in part, on user provided mathematical and/or logical operations as described herein.

Computer Systems

Figure 8:
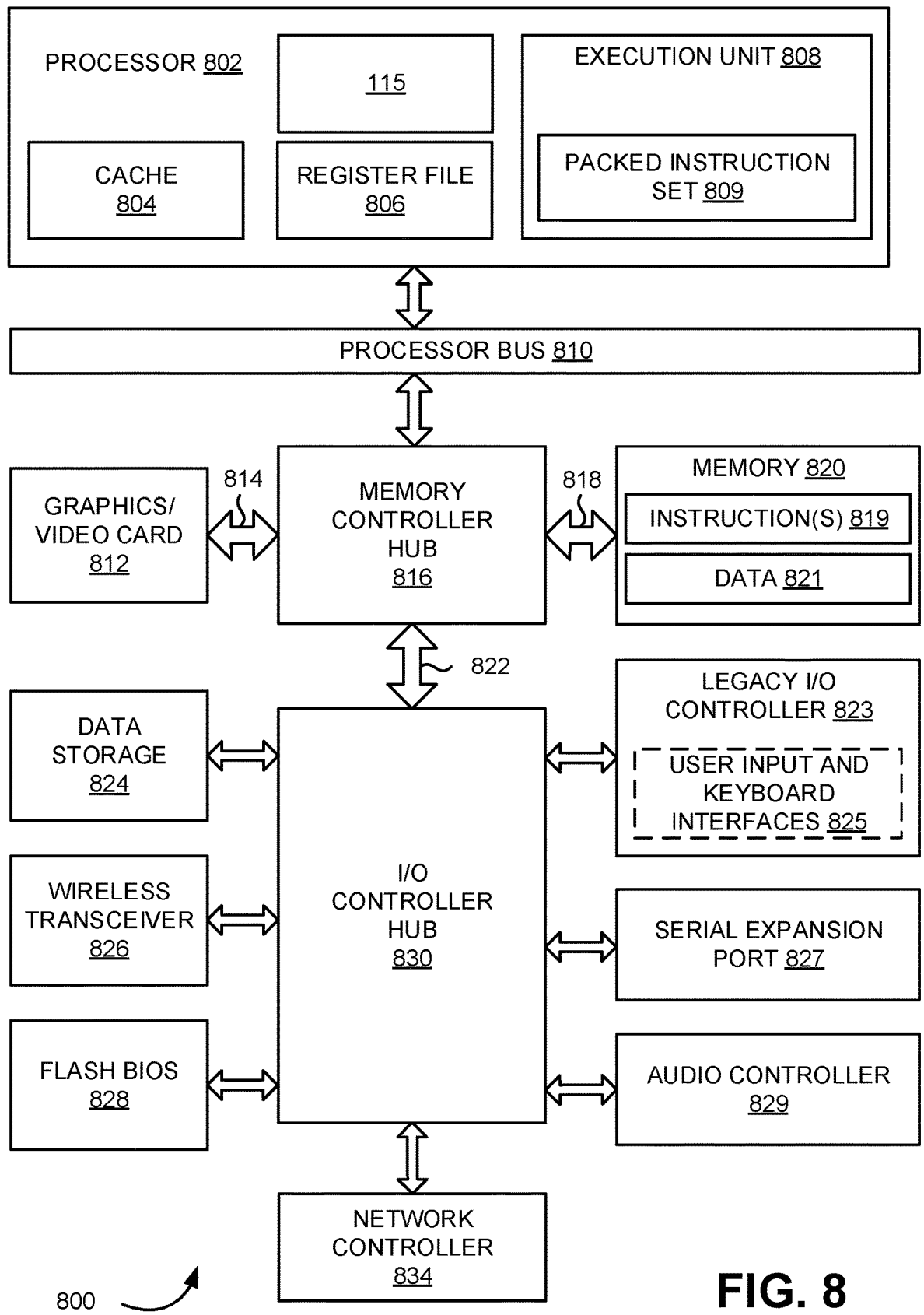
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a DSP, system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a USB port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in system FIG. 8 for executing operators based, at least in part, on user provided mathematical and/or logical operations as described herein.

Figure 9:
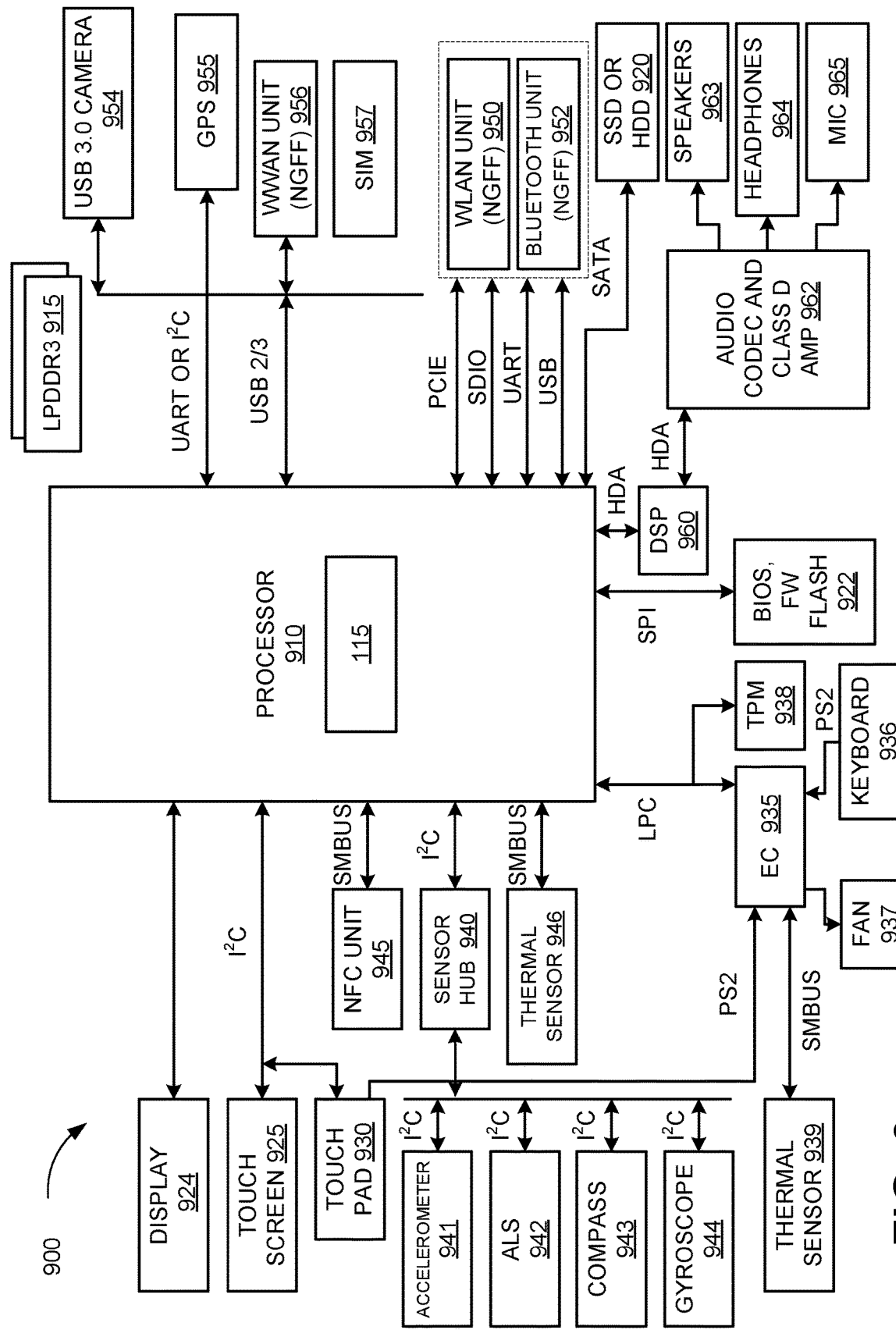
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NEC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Kernel generation component 115 are used to automatically generate compute kernels to perform operations associated with one or more embodiments. Details regarding kernel generation component 115 are provided herein in conjunction with FIG. 9. In at least one embodiment, kernel generation component 115 may be used in system FIG. 6 for executing operators based, at least in part, on user provided mathematical and/or logical operations as described herein.

Figure 10:
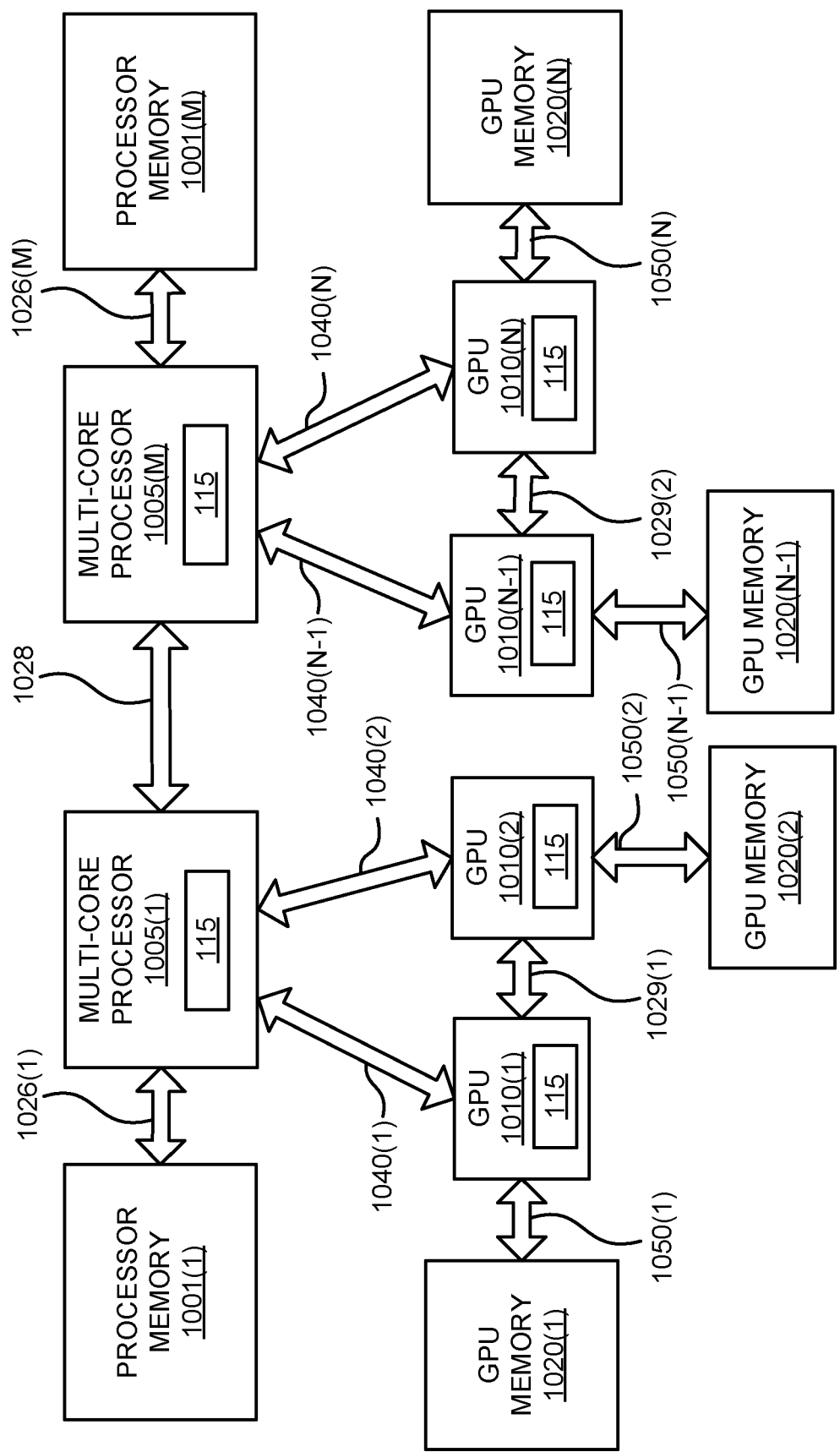
FIG. 10A illustrates a computer system, according to at least one embodiment.
FIG. 10B illustrates a computer system, according to at least one embodiment.
FIG. 10C illustrates a computer system, according to at least one embodiment.
FIG. 10D illustrates a computer system, according to at least one embodiment.
FIGS. 10E and 10F illustrate a shared programming model, according to at least one embodiment.
Figure 10:
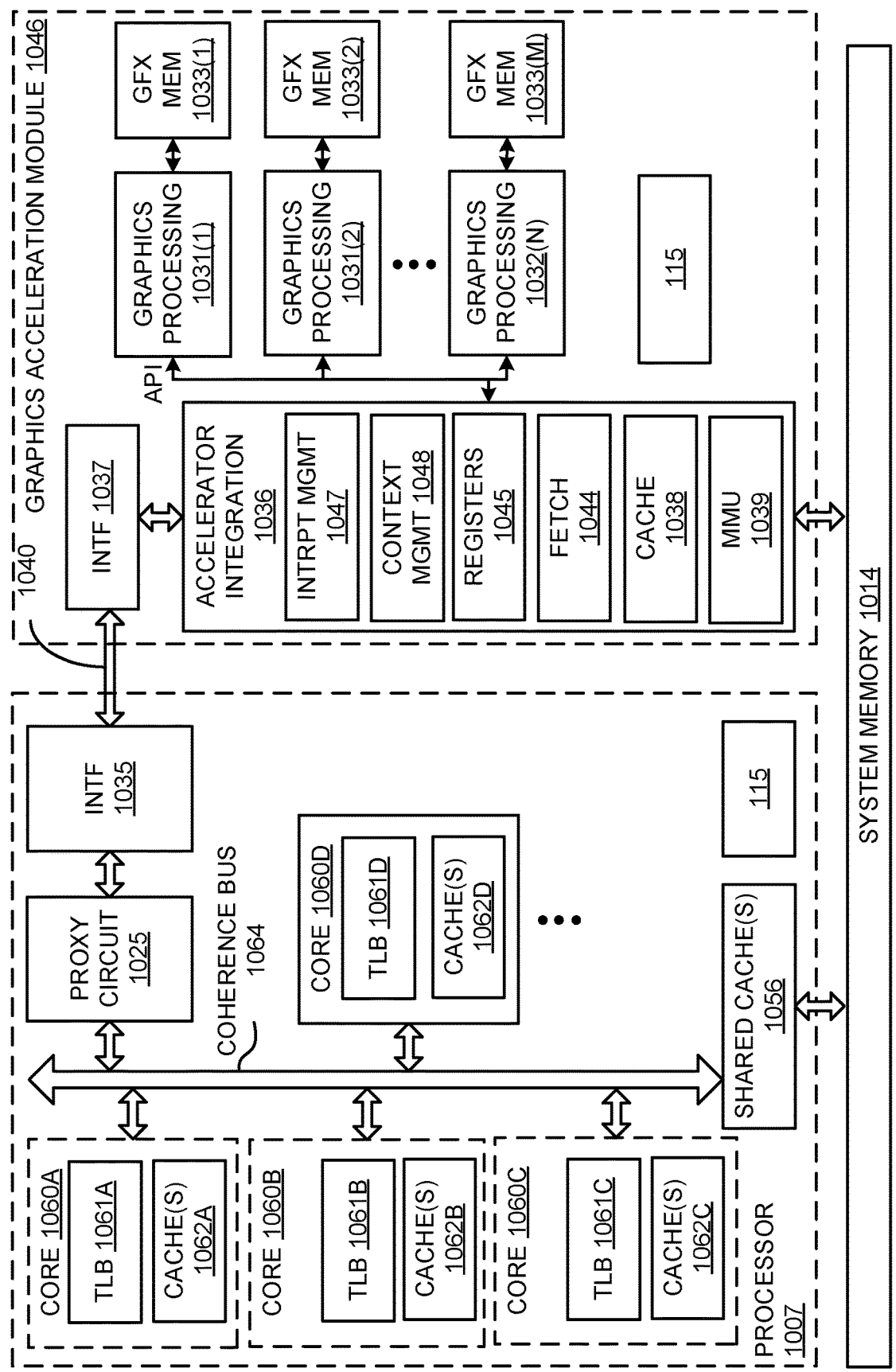
Figure 10:
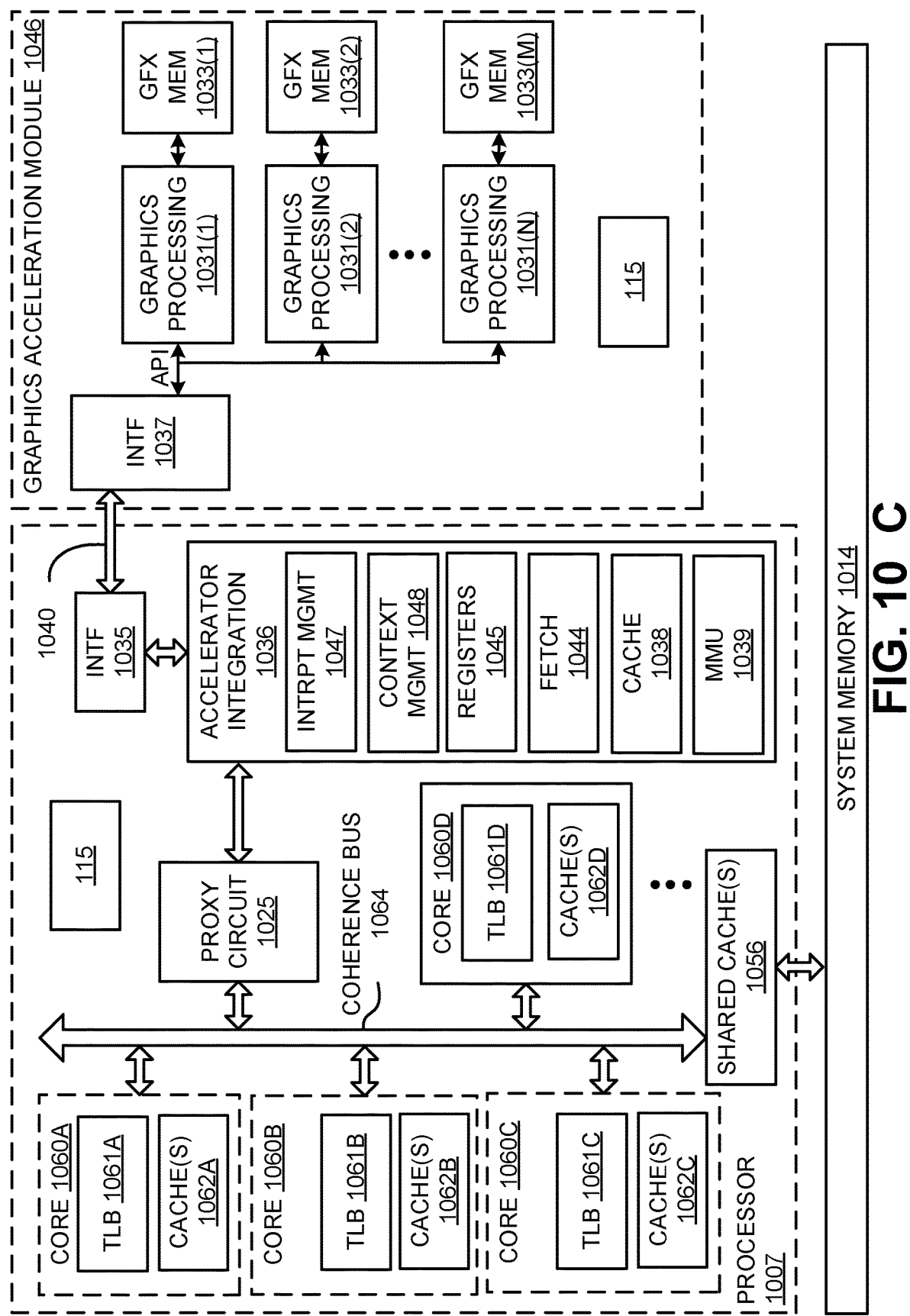
Figure 10:
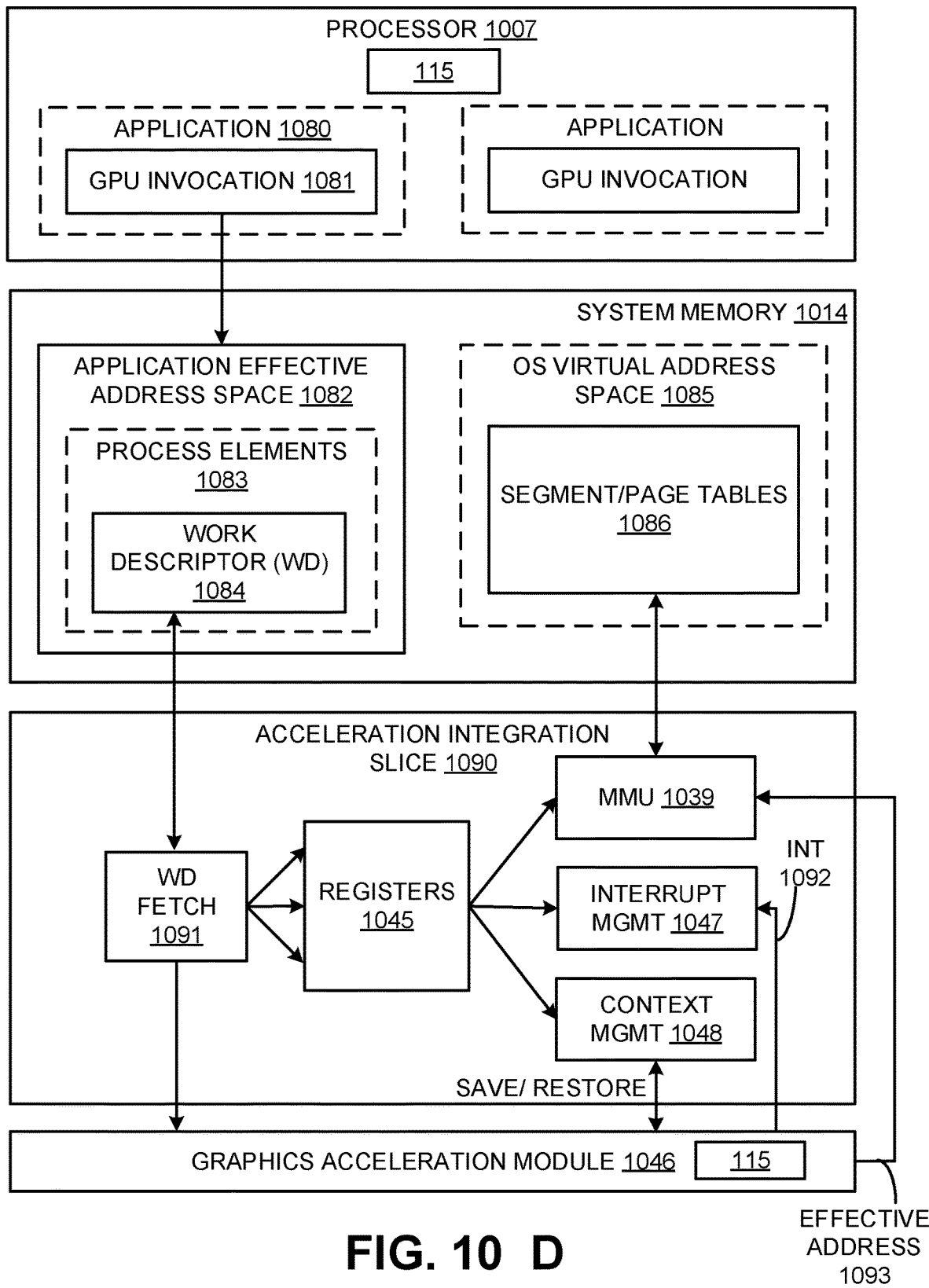
Figure 10:
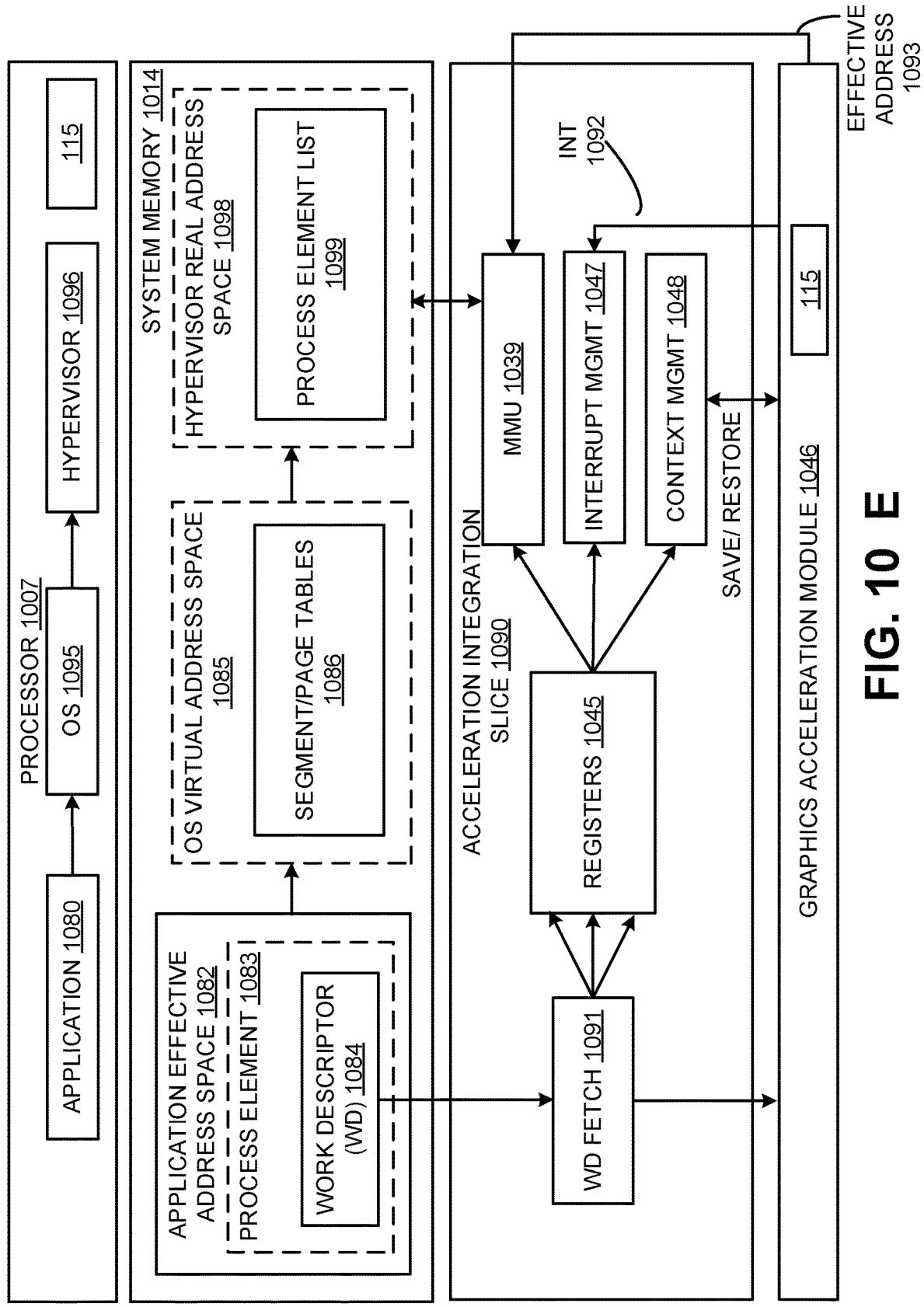
Figure 10:
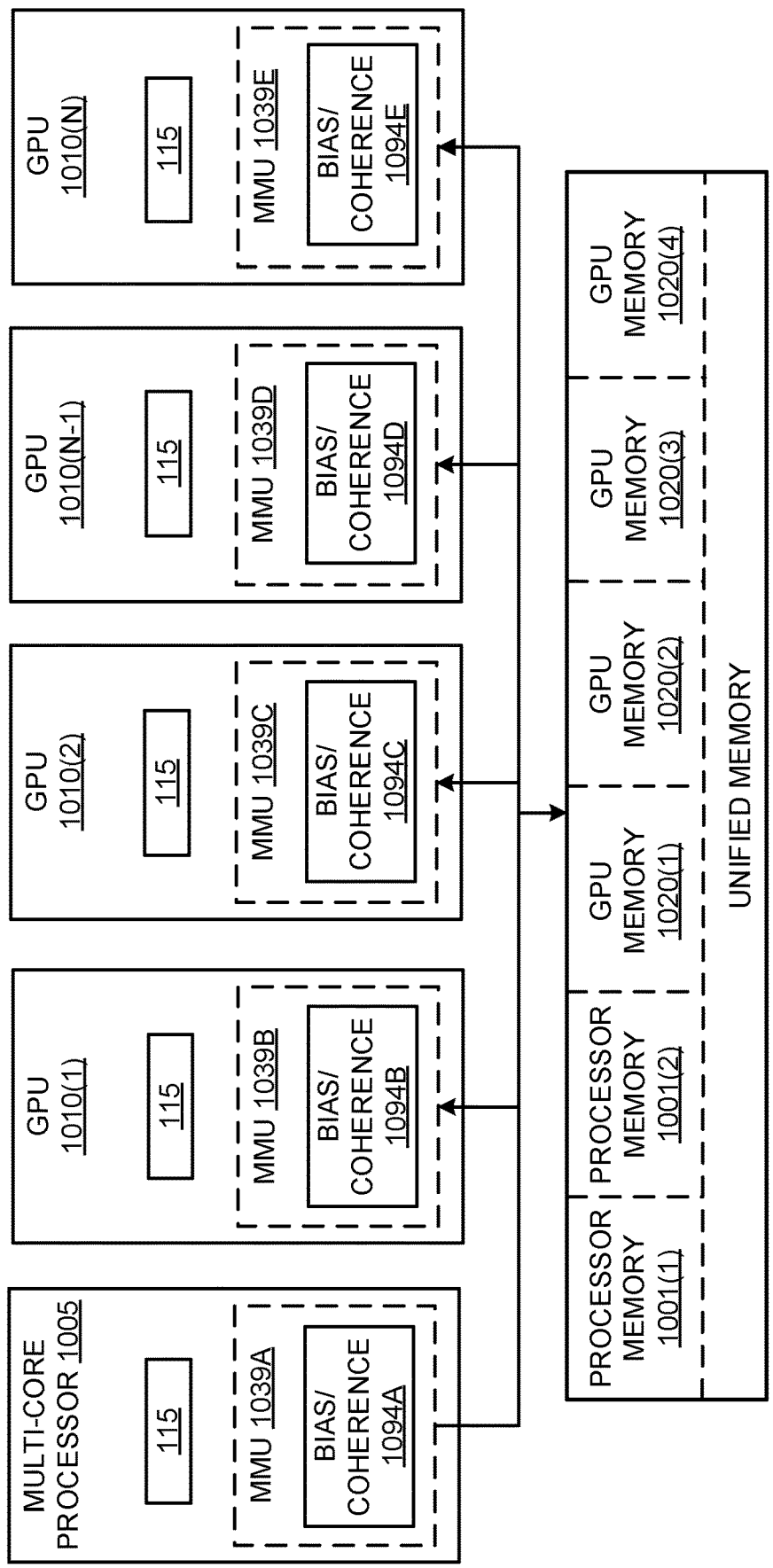

FIG. 10A illustrates an exemplary architecture in which a plurality of GPUs 1010(1)-1010(N) is communicatively coupled to a plurality of multi-core processors 1005(1)-1005(M) over high-speed links 1040(1)-1040(N) (e.g., buses, point-to-point interconnects, etc.). In at least one embodiment, high-speed links 1040(1)-1040(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 1010 are interconnected over high-speed links 1029(1)-1029(2), which may be implemented using similar or different protocols/links than those used for high-speed links 1040(1)-1040(N). Similarly, two or more of multi-core processors 1005 may be connected over a high-speed link 1028 which may be symmetric multi-processor (SMP) buses operating at 20 GB/s, 30 GB/s, 120 GB/s or higher. Alternatively, all communication between various system components shown in FIG. 10A may be accomplished using similar protocols/links (e.g., over a common interconnection fabric).

In at least one embodiment, each multi-core processor 1005 is communicatively coupled to a processor memory 1001(1)-1001(M), via memory interconnects 1026(1)-1026(M), respectively, and each GPU 1010(1)-1010(N) is communicatively coupled to GPU memory 1020(1)-1020(N) over GPU memory interconnects 1050(1)-1050(N), respectively. In at least one embodiment, memory interconnects 1026 and 1050 may utilize similar or different memory access technologies. By way of example, and not limitation, processor memories 1001(1)-1001(M) and GPU memories 1020 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1001 may be volatile memory and another portion may be non-volatile memory (e.g., using a two-level memory (2LM) hierarchy).

As described herein, although various multi-core processors 1005 and GPUs 1010 may be physically coupled to a particular memory 1001, 1020, respectively, and/or a unified memory architecture may be implemented in which a virtual system address space (also referred to as "effective address" space) is distributed among various physical memories. For example, processor memories 1001(1)-1001(M) may each comprise 64 GB of system memory address space and GPU memories 1020(1)-1020(N) may each comprise 32 GB of system memory address space resulting in a total of 256 GB addressable memory when M=2 and N=4. Other values for N and M are possible.

FIG. 10B illustrates additional details for an interconnection between a multi-core processor 1007 and a graphics acceleration module 1046 in accordance with one exemplary embodiment. In at least one embodiment, graphics acceleration module 1046 may include one or more GPU chips integrated on a line card which is coupled to processor 1007 via high-speed link 1040 (e.g., a PCIe bus, NVLink, etc.). In at least one embodiment, graphics acceleration module 1046 may alternatively be integrated on a package or chip with processor 1007.

In at least one embodiment, processor 1007 includes a plurality of cores 1060A-1060D, each with a translation lookaside buffer ("TLB") 1061A-1061D and one or more caches 1062A-1062D. In at least one embodiment, cores 1060A-1060D may include various other components for executing instructions and processing data that are not illustrated. In at least one embodiment, caches 1062A-1062D may comprise Level 1 (L1) and Level 2 (L2) caches. In addition, one or more shared caches 1056 may be included in caches 1062A-1062D and shared by sets of cores 1060A-1060D. For example, one embodiment of processor 1007 includes 24 cores, each with its own L1 cache, twelve shared L2 caches, and twelve shared L3 caches. In this embodiment, one or more L2 and L3 caches are shared by two adjacent cores. In at least one embodiment, processor 1007 and graphics acceleration module 1046 connect with system memory 1014, which may include processor memories 1001(1)-1001(M) of FIG. 10A.

In at least one embodiment, coherency is maintained for data and instructions stored in various caches 1062A-1062D, 1056 and system memory 1014 via inter-core communication over a coherence bus 1064. In at least one embodiment, for example, each cache may have cache coherency logic/circuitry associated therewith to communicate to over coherence bus 1064 in response to detected reads or writes to particular cache lines. In at least one embodiment, a cache snooping protocol is implemented over coherence bus 1064 to snoop cache accesses.

In at least one embodiment, a proxy circuit 1025 communicatively couples graphics acceleration module 1046 to coherence bus 1064, allowing graphics acceleration module 1046 to participate in a cache coherence protocol as a peer of cores 1060A-1060D. In particular, in at least one embodiment, an interface 1035 provides connectivity to proxy circuit 1025 over high-speed link 1040 and an interface 1037 connects graphics acceleration module 1046 to high-speed link 1040.

In at least one embodiment, an accelerator integration circuit 1036 provides cache management, memory access, context management, and interrupt management services on behalf of a plurality of graphics processing engines 1031(1)-1031(N) of graphics acceleration module 1046. In at least one embodiment, graphics processing engines 1031(1)-1031(N) may each comprise a separate GPU. In at least one embodiment, graphics processing engines 1031(1)-1031(N) alternatively may comprise different types of graphics processing engines within a GPU, such as graphics execution units, media processing engines (e.g., video encoders/decoders), samplers, and blit engines. In at least one embodiment, graphics acceleration module 1046 may be a GPU with a plurality of graphics processing engines 1031(1)-1031(N) or graphics processing engines 1031(1)-1031(N) may be individual GPUs integrated on a common package, line card, or chip.

In at least one embodiment, accelerator integration circuit 1036 includes a memory management unit (MMU) 1039 for performing various memory management functions such as virtual-to-physical memory translations (also referred to as effective-to-real memory translations) and memory access protocols for accessing system memory 1014. In at least one embodiment, MMU 1039 may also include a translation lookaside buffer (TLB) (not shown) for caching virtual/effective to physical/real address translations. In at least one embodiment, a cache 1038 can store commands and data for efficient access by graphics processing engines 1031(1)-1031(N). In at least one embodiment, data stored in cache 1038 and graphics memories 1033(1)-1033(M) is kept coherent with core caches 1062A-1062D, 1056 and system memory 1014, possibly using a fetch unit 1044. As mentioned, this may be accomplished via proxy circuit 1025 on behalf of cache 1038 and memories 1033(1)-1033(M) (e.g., sending updates to cache 1038 related to modifications/accesses of cache lines on processor caches 1062A-1062D, 1056 and receiving updates from cache 1038).

In at least one embodiment, a set of registers 1045 store context data for threads executed by graphics processing engines 1031(1)-1031(N) and a context management circuit 1048 manages thread contexts. For example, context management circuit 1048 may perform save and restore operations to save and restore contexts of various threads during contexts switches (e.g., where a first thread is saved and a second thread is stored so that a second thread can be execute by a graphics processing engine). For example, on a context switch, context management circuit 1048 may store current register values to a designated region in memory (e.g., identified by a context pointer). It may then restore register values when returning to a context. In at least one embodiment, an interrupt management circuit 1047 receives and processes interrupts received from system devices.

In at least one embodiment, virtual/effective addresses from a graphics processing engine 1031 are translated to real/physical addresses in system memory 1014 by MMU 1039. In at least one embodiment, accelerator integration circuit 1036 supports multiple (e.g., 4, 8, 16) graphics accelerator modules 1046 and/or other accelerator devices. In at least one embodiment, graphics accelerator module 1046 may be dedicated to a single application executed on processor 1007 or may be shared between multiple applications. In at least one embodiment, a virtualized graphics execution environment is presented in which resources of graphics processing engines 1031(1)-1031(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1036 performs as a bridge to a system for graphics acceleration module 1046 and provides address translation and system memory cache services. In addition, in at least one embodiment, accelerator integration circuit 1036 may provide virtualization facilities for a host processor to manage virtualization of graphics processing engines 1031(1)-1031(N), interrupts, and memory management.

In at least one embodiment, because hardware resources of graphics processing engines 1031(1)-1031(N) are mapped explicitly to a real address space seen by host processor 1007, any host processor can address these resources directly using an effective address value. In at least one embodiment, one function of accelerator integration circuit 1036 is physical separation of graphics processing engines 1031(1)-1031(N) so that they appear to a system as independent units.

In at least one embodiment, one or more graphics memories 1033(1)-1033(M) are coupled to each of graphics processing engines 1031(1)-1031(N), respectively and N=M. In at least one embodiment, graphics memories 1033(1)-1033(M) store instructions and data being processed by each of graphics processing engines 1031(1)-1031(N). In at least one embodiment, graphics memories 1033(1)-1033(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1040, biasing techniques can be used to ensure that data stored in graphics memories 1033(1)-1033(M) is data that will be used most frequently by graphics processing engines 1031(1)-1031(N) and preferably not used by cores 1060A-1060D (at least not frequently). Similarly, in at least one embodiment, a biasing mechanism attempts to keep data needed by cores (and preferably not graphics processing engines 1031(1)-1031(N)) within caches 1062A-1062D, 1056 and system memory 1014.

FIG. 10C illustrates another exemplary embodiment in which accelerator integration circuit 1036 is integrated within processor 1007. In this embodiment, graphics processing engines 1031(1)-1031(N) communicate directly over high-speed link 1040 to accelerator integration circuit 1036 via interface 1037 and interface 1035 (which, again, may be any form of bus or interface protocol). In at least one embodiment, accelerator integration circuit 1036 may perform similar operations as those described with respect to FIG. 10B, but potentially at a higher throughput given its close proximity to coherence bus 1064 and caches 1062A-1062D, 1056. In at least one embodiment, an accelerator integration circuit supports different programming models including a dedicated-process programming model (no graphics acceleration module virtualization) and shared programming models (with virtualization), which may include programming models which are controlled by accelerator integration circuit 1036 and programming models which are controlled by graphics acceleration module 1046.

In at least one embodiment, graphics processing engines 1031(1)-1031(N) are dedicated to a single application or process under a single operating system. In at least one embodiment, a single application can funnel other application requests to graphics processing engines 1031(1)-1031(N), providing virtualization within a VM/partition.

In at least one embodiment, graphics processing engines 1031(1)-1031(N), may be shared by multiple VM/application partitions. In at least one embodiment, shared models may use a system hypervisor to virtualize graphics processing engines 1031(1)-1031(N) to allow access by each operating system. In at least one embodiment, for single-partition systems without a hypervisor, graphics processing engines 1031(1)-1031(N) are owned by an operating system. In at least one embodiment, an operating system can virtualize graphics processing engines 1031(1)-1031(N) to provide access to each process or application.

In at least one embodiment, graphics acceleration module 1046 or an individual graphics processing engine 1031(1)-1031(N) selects a process element using a process handle. In at least one embodiment, process elements are stored in system memory 1014 and are addressable using an effective address to real address translation technique described herein. In at least one embodiment, a process handle may be an implementation-specific value provided to a host process when registering its context with graphics processing engine 1031(1)-1031(N) (that is, calling system software to add a process element to a process element linked list). In at least one embodiment, a lower 16-bits of a process handle may be an offset of a process element within a process element linked list.

FIG. 10D illustrates an exemplary accelerator integration slice 1090. In at least one embodiment, a "slice" comprises a specified portion of processing resources of accelerator integration circuit 1036. In at least one embodiment, an application is effective address space 1082 within system memory 1014 stores process elements 1083. In at least one embodiment, process elements 1083 are stored in response to GPU invocations 1081 from applications 1080 executed on processor 1007. In at least one embodiment, a process element 1083 contains process state for corresponding application 1080. In at least one embodiment, a work descriptor (WD) 1084 contained in process element 1083 can be a single job requested by an application or may contain a pointer to a queue of jobs. In at least one embodiment, WD 1084 is a pointer to a job request queue in an application's effective address space 1082.

In at least one embodiment, graphics acceleration module 1046 and/or individual graphics processing engines 1031(1)-1031(N) can be shared by all or a subset of processes in a system. In at least one embodiment, an infrastructure for setting up process states and sending a WD 1084 to a graphics acceleration module 1046 to start a job in a virtualized environment may be included.

In at least one embodiment, a dedicated-process programming model is implementation-specific. In at least one embodiment, in this model, a single process owns graphics acceleration module 1046 or an individual graphics processing engine 1031. In at least one embodiment, when graphics acceleration module 1046 is owned by a single process, a hypervisor initializes accelerator integration circuit 1036 for an owning partition and an operating system initializes accelerator integration circuit 1036 for an owning process when graphics acceleration module 1046 is assigned.

In at least one embodiment, in operation, a WD fetch unit 1091 in accelerator integration slice 1090 fetches next WD 1084, which includes an indication of work to be done by one or more graphics processing engines of graphics acceleration module 1046. In at least one embodiment, data from WD 1084 may be stored in registers 1045 and used by MMU 1039, interrupt management circuit 1047 and/or context management circuit 1048 as illustrated. For example, one embodiment of MMU 1039 includes segment/page walk circuitry for accessing segment/page tables 1086 within an OS virtual address space 1085. In at least one embodiment, interrupt management circuit 1047 may process interrupt events 1092 received from graphics acceleration module 1046. In at least one embodiment, when performing graphics operations, an effective address 1093 generated by a graphics processing engine 1031(1)-1031(N) is translated to a real address by MMU 1039.

In at least one embodiment, registers 1045 are duplicated for each graphics processing engine 1031(1)-1031(N) and/or graphics acceleration module 1046 and may be initialized by a hypervisor or an operating system. In at least one embodiment, each of these duplicated registers may be included in an accelerator integration slice 1090. Exemplary registers that may be initialized by a hypervisor are shown in Table 1.

TABLE 1

Hypervisor Initialized Registers

| Register # | Description |
| --- | --- |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
| --- | --- |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 1084 is specific to a particular graphics acceleration module 1046 and/or graphics processing engines 1031(1)-1031(N). In at least one embodiment, it contains all information required by a graphics processing engine 1031(1)-1031(N) to do work, or it can be a pointer to a memory location where an application has set up a command queue of work to be completed.

FIG. 10E illustrates additional details for one exemplary embodiment of a shared model. This embodiment includes a hypervisor real address space 1098 in which a process element list 1099 is stored. In at least one embodiment, hypervisor real address space 1098 is accessible via a hypervisor 1096 which virtualizes graphics acceleration module engines for operating system 1095.

In at least one embodiment, shared programming models allow for all or a subset of processes from all or a subset of partitions in a system to use a graphics acceleration module 1046. In at least one embodiment, there are two programming models where graphics acceleration module 1046 is shared by multiple processes and partitions, namely time-sliced shared and graphics directed shared.

In at least one embodiment, in this model, system hypervisor 1096 owns graphics acceleration module 1046 and makes its function available to all operating systems 1095. In at least one embodiment, for a graphics acceleration module 1046 to support virtualization by system hypervisor 1096, graphics acceleration module 1046 may adhere to certain requirements, such as (1) an application's job request must be autonomous (that is, state does not need to be maintained between jobs), or graphics acceleration module 1046 must provide a context save and restore mechanism, (2) an application's job request is guaranteed by graphics acceleration module 1046 to complete in a specified amount of time, including any translation faults, or graphics acceleration module 1046 provides an ability to preempt processing of a job, and (3) graphics acceleration module 1046 must be guaranteed fairness between processes when operating in a directed shared programming model.

In at least one embodiment, application 1080 is required to make an operating system 1095 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 1046 and can be in a form of a graphics acceleration module 1046 command, an effective address pointer to a user-defined structure, an effective address pointer to a queue of commands, or any other data structure to describe work to be done by graphics acceleration module 1046.

In at least one embodiment, an AMR value is an AMR state to use for a current process. In at least one embodiment, a value passed to an operating system is similar to an application setting an AMR. In at least one embodiment, if accelerator integration circuit 1036 (not shown) and graphics acceleration module 1046 implementations do not support a User Authority Mask Override Register (UAMOR), an operating system may apply a current UAMOR value to an AMR value before passing an AMR in a hypervisor call. In at least one embodiment, hypervisor 1096 may optionally apply a current Authority Mask Override Register (AMOR) value before placing an AMR into process element 1083. In at least one embodiment, CSRP is one of registers 1045 containing an effective address of an area in an application's effective address space 1082 for graphics acceleration module 1046 to save and restore context state. In at least one embodiment, this pointer is optional if no state is required to be saved between jobs or when a job is preempted. In at least one embodiment, context save/restore area may be pinned system memory.

Upon receiving a system call, operating system 1095 may verify that application 1080 has registered and been given authority to use graphics acceleration module 1046. In at least one embodiment, operating system 1095 then calls hypervisor 1096 with information shown in Table 3.

TABLE 3

OS to Hypervisor Call Parameters

| Parameter # | Description |
| --- | --- |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |

TABLE 3-continued

OS to Hypervisor Call Parameters

| Parameter # | Description |
|---|---|
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 1096 verifies that operating system 1095 has registered and been given authority to use graphics acceleration module 1046. In at least one embodiment, hypervisor 1096 then puts process element 1083 into a process element linked list for a corresponding graphics acceleration module 1046 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 1090 registers 1045.

As illustrated in FIG. 10F, in at least one embodiment, a unified memory is used, addressable via a common virtual memory address space used to access physical processor memories 1001(1)-1001(N) and GPU memories 1020(1)-1020(N). In this implementation, operations executed on GPUs 1010(1)-1010(N) utilize a same virtual/effective memory address space to access processor memories 1001(1)-1001(M) and vice versa, thereby simplifying programmability. In at least one embodiment, a first portion of a virtual/effective address space is allocated to processor memory 1001(1), a second portion to second processor memory 1001(N), a third portion to GPU memory 1020(1), and so on. In at least one embodiment, an entire virtual/effective memory space (sometimes referred to as an effective address space) is thereby distributed across each of processor memories 1001 and GPU memories 1020, allowing any processor or GPU to access any physical memory with a virtual address mapped to that memory.

In at least one embodiment, bias/coherence management circuitry 1094A-1094E within one or more of MMUs 1039A-1039E ensures cache coherence between caches of one or more host processors (e.g., 1005) and GPUs 1010 and implements biasing techniques indicating physical memories in which certain types of data should be stored. In at least one embodiment, while multiple instances of bias/coherence management circuitry 1094A-1094E are illustrated in FIG. 10F, bias/coherence circuitry may be implemented within an MMU of one or more host processors 1005 and/or within accelerator integration circuit 1036.

One embodiment allows GPU memories 1020 to be mapped as part of system memory, and accessed using shared virtual memory (SVM) technology, but without suffering performance drawbacks associated with full system cache coherence. In at least one embodiment, an ability for GPU memories 1020 to be accessed as system memory without onerous cache coherence overhead provides a beneficial operating environment for GPU offload. In at least one embodiment, this arrangement allows software of host processor 1005 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 1020 without cache coherence overheads can be critical to execution time of an offloaded computation. In at least one embodiment, in cases with substantial streaming write memory traffic, for example, cache coherence overhead can significantly reduce an effective write bandwidth seen by a GPU 1010. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 1020, with or without a bias cache in a GPU 1010 (e.g., to cache frequently/recently used entries of a bias table). Alternatively, in at least one embodiment, an entire bias table may be maintained within a GPU.

In at least one embodiment, a bias table entry associated with each access to a GPU attached memory 1020 is accessed prior to actual access to a GPU memory, causing following operations. In at least one embodiment, local requests from a GPU 1010 that find their page in GPU bias are forwarded directly to a corresponding GPU memory 1020. In at least one embodiment, local requests from a GPU that find their page in host bias are forwarded to processor 1005 (e.g., over a high-speed link as described herein). In at least one embodiment, requests from processor 1005 that find a requested page in host processor bias complete a request like a normal memory read. Alternatively, requests directed to a GPU-biased page may be forwarded to a GPU 1010. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 1005 bias to GPU bias, but is not for an opposite transition.

In at least one embodiment, cache coherency is maintained by temporarily rendering GPU-biased pages uncacheable by host processor 1005. In at least one embodiment, to access these pages, processor 1005 may request access from GPU 1010, which may or may not grant access right away. In at least one embodiment, thus, to reduce communication between processor 1005 and GPU 1010 it is beneficial to ensure that GPU-biased pages are those which are required by a GPU but not host processor 1005 and vice versa.

Hardware structure(s) 110 are used to perform one or more embodiments. Details regarding kernel generation component 115 may be provided herein in conjunction with FIG. 1.

Figure 11A:
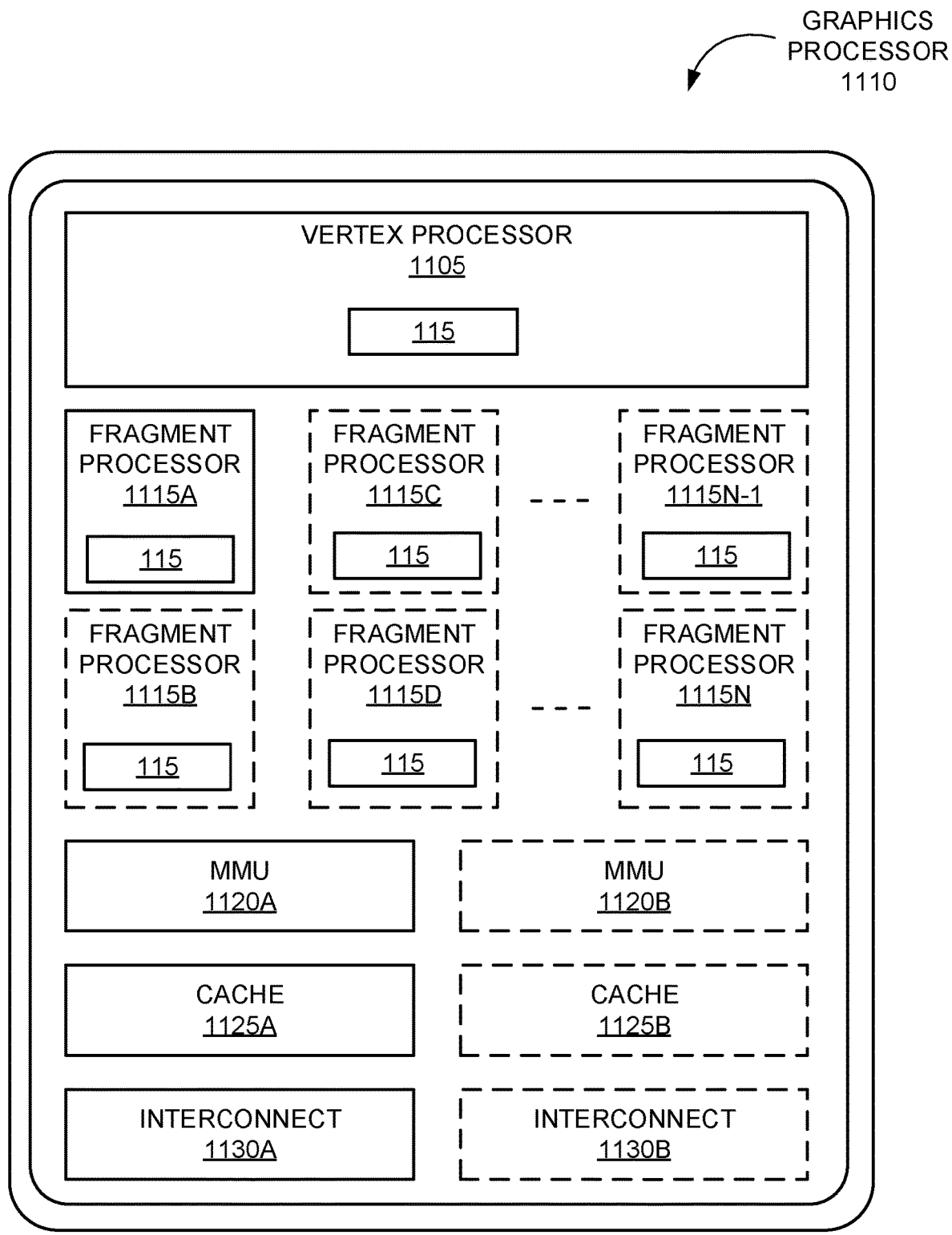
FIGS. 11A-11B illustrate exemplary integrated circuits and associated graphics processors, according to at least one embodiment.
Figure 11B:
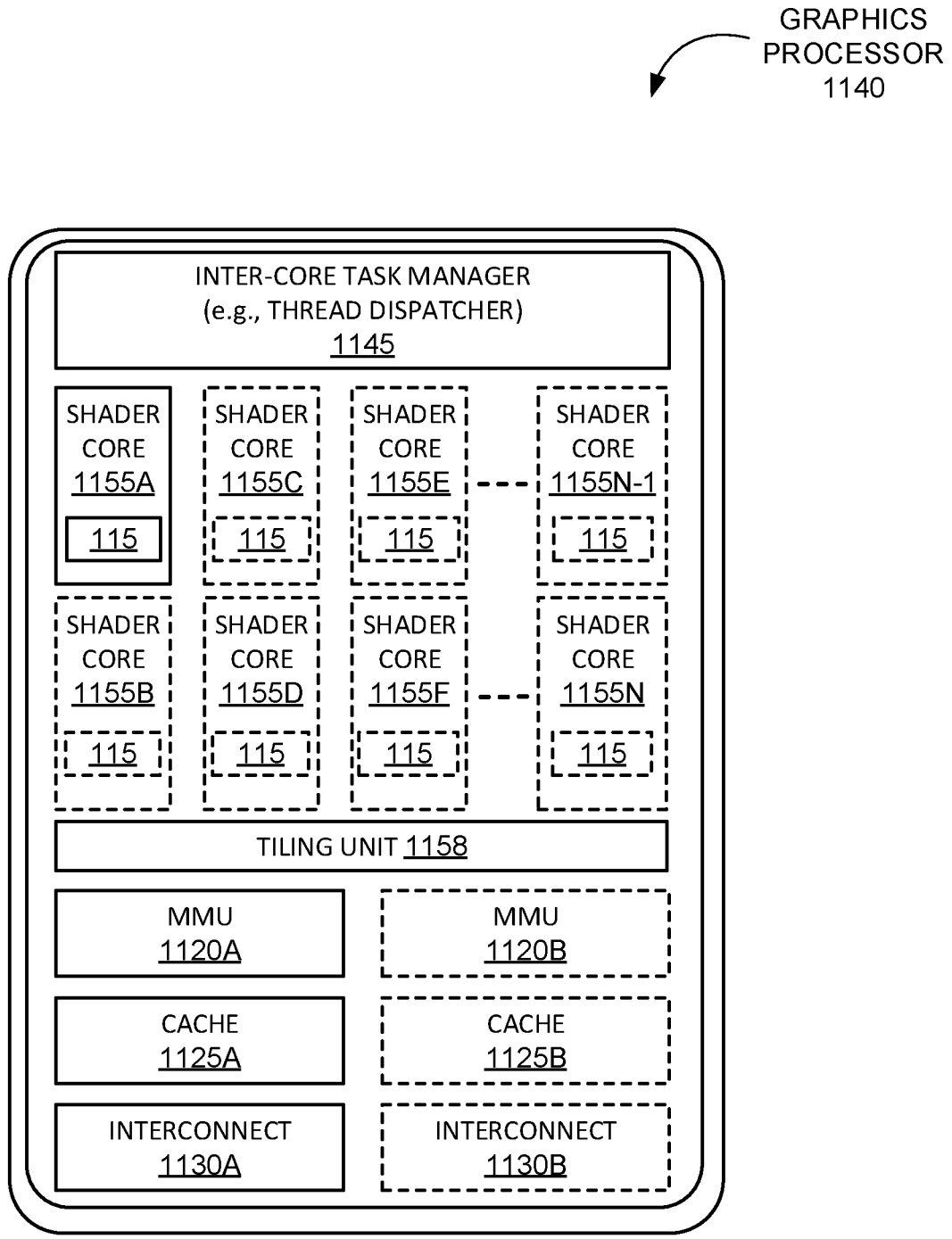

FIGS. 11A-11B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 11A-11B are block diagrams illustrating exemplary graphics processors for use within an SoC, according to embodiments described herein. FIG. 11A illustrates an exemplary graphics processor 1110 of a system on a chip integrated circuit that may be fabricated using one or more IP cores, according to at least one embodiment. FIG. 11B illustrates an additional exemplary graphics processor 1140 of a system on a chip integrated circuit that may be fabricated using one or more IP cores, according to at least one embodiment. In at least one embodiment, graphics processor 1110 of FIG. 11A is a low power graphics processor core. In at least one embodiment, graphics processor 1140 of FIG. 11B is a higher performance graphics processor core.

In at least one embodiment, graphics processor 1110 includes a vertex processor 1105 and one or more fragment processor(s) 1115A-1115N (e.g., 1115A, 1115B, 1115C, 1115D, through 1115N-1, and 1115N). In at least one embodiment, graphics processor 1110 can execute different shader programs via separate logic, such that vertex processor 1105 is optimized to execute operations for vertex shader programs, while one or more fragment processor(s) 1115A-1115N execute fragment (e.g., pixel) shading operations for fragment or pixel shader programs. In at least one embodiment, vertex processor 1105 performs a vertex processing stage of a 3D graphics pipeline and generates primitives and vertex data. In at least one embodiment, fragment processor(s) 1115A-1115N use primitive and vertex data generated by vertex processor 1105 to produce a framebuffer that is displayed on a display device. In at least one embodiment, fragment processor(s) 1115A-1115N are optimized to execute fragment shader programs as provided for in an OpenGL API, which may be used to perform similar operations as a pixel shader program as provided for in a Direct 3D API.

In at least one embodiment, graphics processor 1110 additionally includes one or more memory management units (MMUs) 1120A-1120B, cache(s) 1125A-1125B, and circuit interconnect(s) 1130A-1130B. In at least one embodiment, one or more MMU(s) 1120A-1120B provide for virtual to physical address mapping for graphics processor 1110, including for vertex processor 1105 and/or fragment processor(s) 1115A-1115N, which may reference vertex or image/texture data stored in memory, in addition to vertex or image/texture data stored in one or more cache(s) 1125A-1125B. In at least one embodiment, one or more MMU(s) 1120A-1120B may be synchronized with other MMUs within a system, including one or more MMUs associated with one or more image processors. In at least one embodiment, one or more circuit interconnect(s) 1130A-1130B enable graphics processor 1110 to interface with other IP cores within SoC, either via an internal bus of SoC or via a direct connection.

In at least one embodiment, graphics processor 1140 includes one or more shader core(s) 1155A-1155N (e.g., 1155A, 1155B, 1155C, 1155D, 1155E, 1155F, through 1155N-1, and 1155N) as shown in FIG. 11B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1140 includes an inter-core task manager 1145, which acts as a thread dispatcher to dispatch execution threads to one or more shader cores 1155A-1155N and a tiling unit 1158 to accelerate tiling operations for tile-based rendering, in which rendering operations for a scene are subdivided in image space, for example to exploit local spatial coherence within a scene or to optimize use of internal caches.

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in integrated circuit 11A and/or 11B for executing operators based, at least in part, on user provided mathematical and/or logical operations as described herein.

Figure 12A:
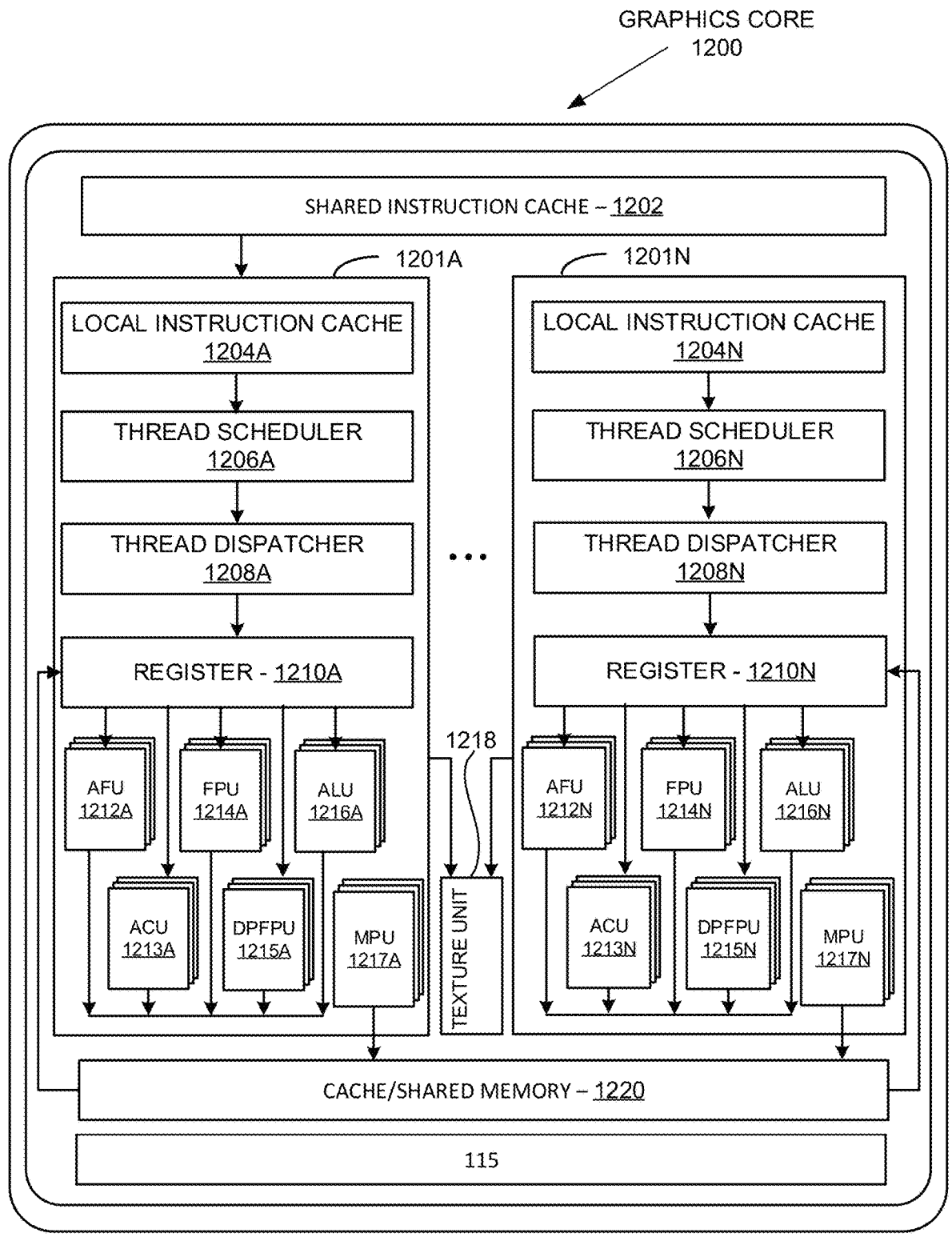
FIGS. 12A-12B illustrate additional exemplary graphics processor logic according to at least one embodiment.
Figure 12B:
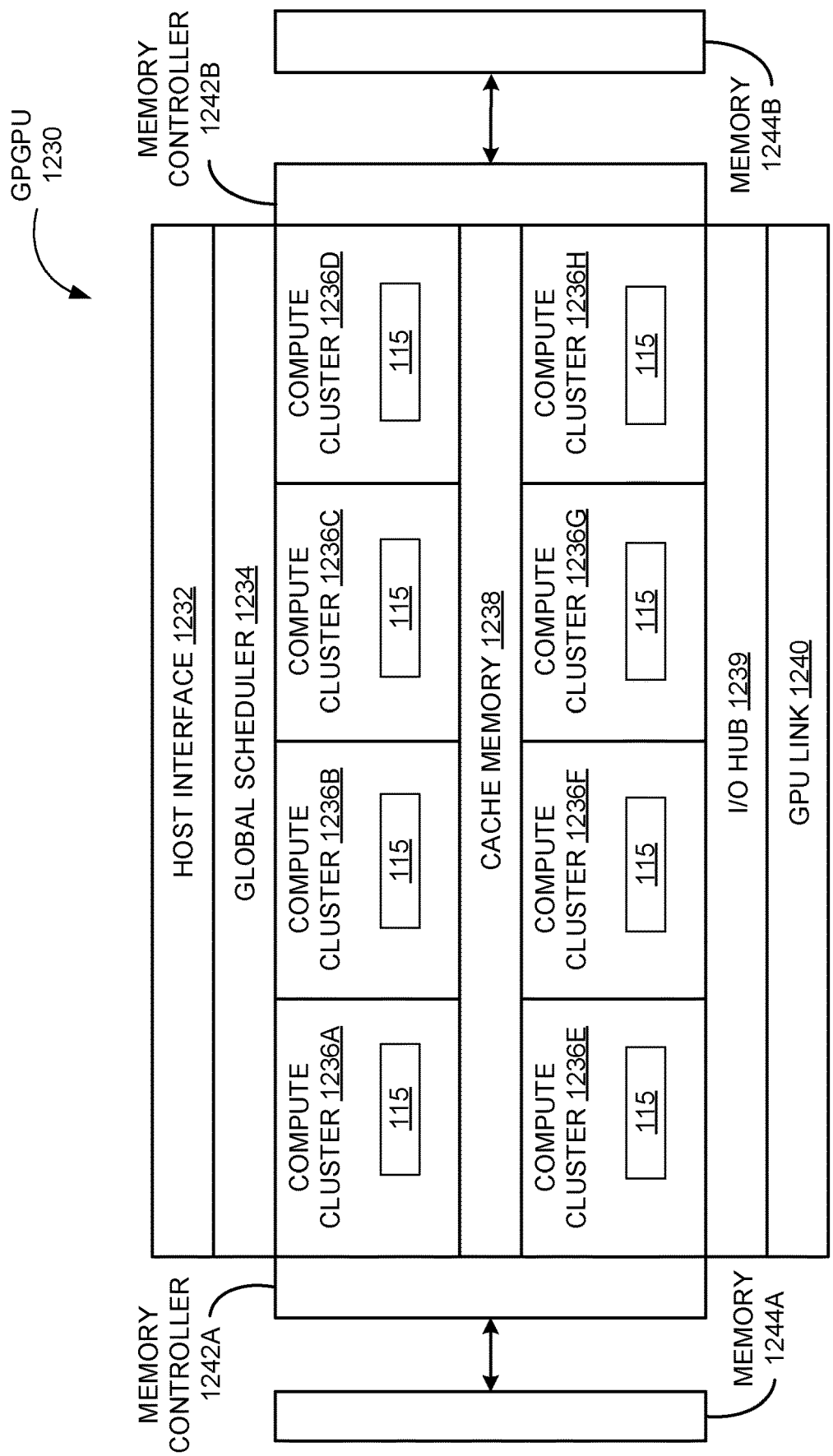

FIGS. 12A-12B illustrate additional exemplary graphics processor logic according to embodiments described herein. FIG. 12A illustrates a graphics core 1200 that may be included within graphics processor, in at least one embodiment, and may be a unified shader core 1155A-1155N as in FIG. 11B in at least one embodiment. FIG. 12B illustrates a highly-parallel general-purpose graphics processing unit ("GPGPU") 1230 suitable for deployment on a multi-chip module in at least one embodiment.

In at least one embodiment, graphics core 1200 includes a shared instruction cache 1202, a texture unit 1218, and a cache/shared memory 1220 that are common to execution resources within graphics core 1200. In at least one embodiment, graphics core 1200 can include multiple slices 1201A-1201N or a partition for each core, and a graphics processor can include multiple instances of graphics core 1200. In at least one embodiment, slices 1201A-1201N can include support logic including a local instruction cache 1204A-1204N, a thread scheduler 1206A-1206N, a thread dispatcher 1208A-1208N, and a set of registers 1210A-1210N. In at least one embodiment, slices 1201A-1201N can include a set of additional function units (AFUs 1212A-1212N), floating-point units (FPUs 1214A-1214N), integer arithmetic logic units (ALUs 1216A-1216N), address computational units (ACUs 1213A-1213N), double-precision floating-point units (DPFPUs 1215A-1215N), and matrix processing units (MPUs 1217A-1217N).

In at least one embodiment, FPUs 1214A-1214N can perform single-precision (32-bit) and half-precision (16-bit) floating point operations, while DPFPUs 1215A-1215N perform double precision (64-bit) floating point operations. In at least one embodiment, ALUs 1216A-1216N can perform variable precision integer operations at 8-bit, 16-bit, and 32-bit precision, and can be configured for mixed precision operations. In at least one embodiment, MPUs 1217A-1217N can also be configured for mixed precision matrix operations, including half-precision floating point and 8-bit integer operations. In at least one embodiment, MPUs 1217-1217N can perform a variety of matrix operations to accelerate machine learning application frameworks, including enabling support for accelerated general matrix to matrix multiplication (GEMM). In at least one embodiment, AFUs 1212A-1212N can perform additional logic operations not supported by floating-point or integer units, including trigonometric operations (e.g., sine, cosine, etc.).

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in graphics core 1200 for executing operators based, at least in part, on user provided mathematical and/or logical operations as described herein.

FIG. 12B illustrates a general-purpose processing unit (GPGPU) 1230 that can be configured to enable highly-parallel compute operations to be performed by an array of graphics processing units, in at least one embodiment. In at least one embodiment, GPGPU 1230 can be linked directly to other instances of GPGPU 1230 to create a multi-GPU cluster to improve training speed for deep neural networks. In at least one embodiment, GPGPU 1230 includes a host interface 1232 to enable a connection with a host processor. In at least one embodiment, host interface 1232 is a PCI Express interface. In at least one embodiment, host interface 1232 can be a vendor-specific communications interface or communications fabric. In at least one embodiment, GPGPU 1230 receives commands from a host processor and uses a global scheduler 1234 to distribute execution threads associated with those commands to a set of compute clusters 1236A-1236H. In at least one embodiment, compute clusters 1236A-1236H share a cache memory 1238. In at least one embodiment, cache memory 1238 can serve as a higher-level cache for cache memories within compute clusters 1236A-1236H.

In at least one embodiment, GPGPU 1230 includes memory 1244A-1244B coupled with compute clusters 1236A-1236H via a set of memory controllers 1242A-1242B. In at least one embodiment, memory 1244A-1244B can include various types of memory devices including dynamic random access memory (DRAM) or graphics random access memory, such as synchronous graphics random access memory (SGRAM), including graphics double data rate (GDDR) memory.

In at least one embodiment, compute clusters 1236A-1236H each include a set of graphics cores, such as graphics core 1200 of FIG. 12A, which can include multiple types of integer and floating point logic units that can perform computational operations at a range of precisions including suited for machine learning computations. For example, in at least one embodiment, at least a subset of floating point units in each of compute clusters 1236A-1236H can be configured to perform 16-bit or 32-bit floating point operations, while a different subset of floating point units can be configured to perform 64-bit floating point operations.

In at least one embodiment, multiple instances of GPGPU 1230 can be configured to operate as a compute cluster. In at least one embodiment, communication used by compute clusters 1236A-1236H for synchronization and data exchange varies across embodiments. In at least one embodiment, multiple instances of GPGPU 1230 communicate over host interface 1232. In at least one embodiment, GPGPU 1230 includes an I/O hub 1239 that couples GPGPU 1230 with a GPU link 1240 that enables a direct connection to other instances of GPGPU 1230. In at least one embodiment, GPU link 1240 is coupled to a dedicated GPU-to-GPU bridge that enables communication and synchronization between multiple instances of GPGPU 1230. In at least one embodiment, GPU link 1240 couples with a high-speed interconnect to transmit and receive data to other GPGPUs or parallel processors. In at least one embodiment, multiple instances of GPGPU 1230 are located in separate data processing systems and communicate via a network device that is accessible via host interface 1232. In at least one embodiment GPU link 1240 can be configured to enable a connection to a host processor in addition to or as an alternative to host interface 1232.

In at least one embodiment, GPGPU 1230 can be configured to train neural networks. In at least one embodiment, GPGPU 1230 can be used within an inferencing platform. In at least one embodiment, in which GPGPU 1230 is used for inferencing, GPGPU 1230 may include fewer compute clusters 1236A-1236H relative to when GPGPU 1230 is used for training a neural network. In at least one embodiment, memory technology associated with memory 1244A-1244B may differ between inferencing and training configurations, with higher bandwidth memory technologies devoted to training configurations. In at least one embodiment, an inferencing configuration of GPGPU 1230 can support inferencing specific instructions. For example, in at least one embodiment, an inferencing configuration can provide support for one or more 8-bit integer dot product instructions, which may be used during inferencing operations for deployed neural networks.

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in GPGPU 1230 for executing operators based, at least in part, on user provided mathematical and/or logical operations as described herein.

Figure 13:
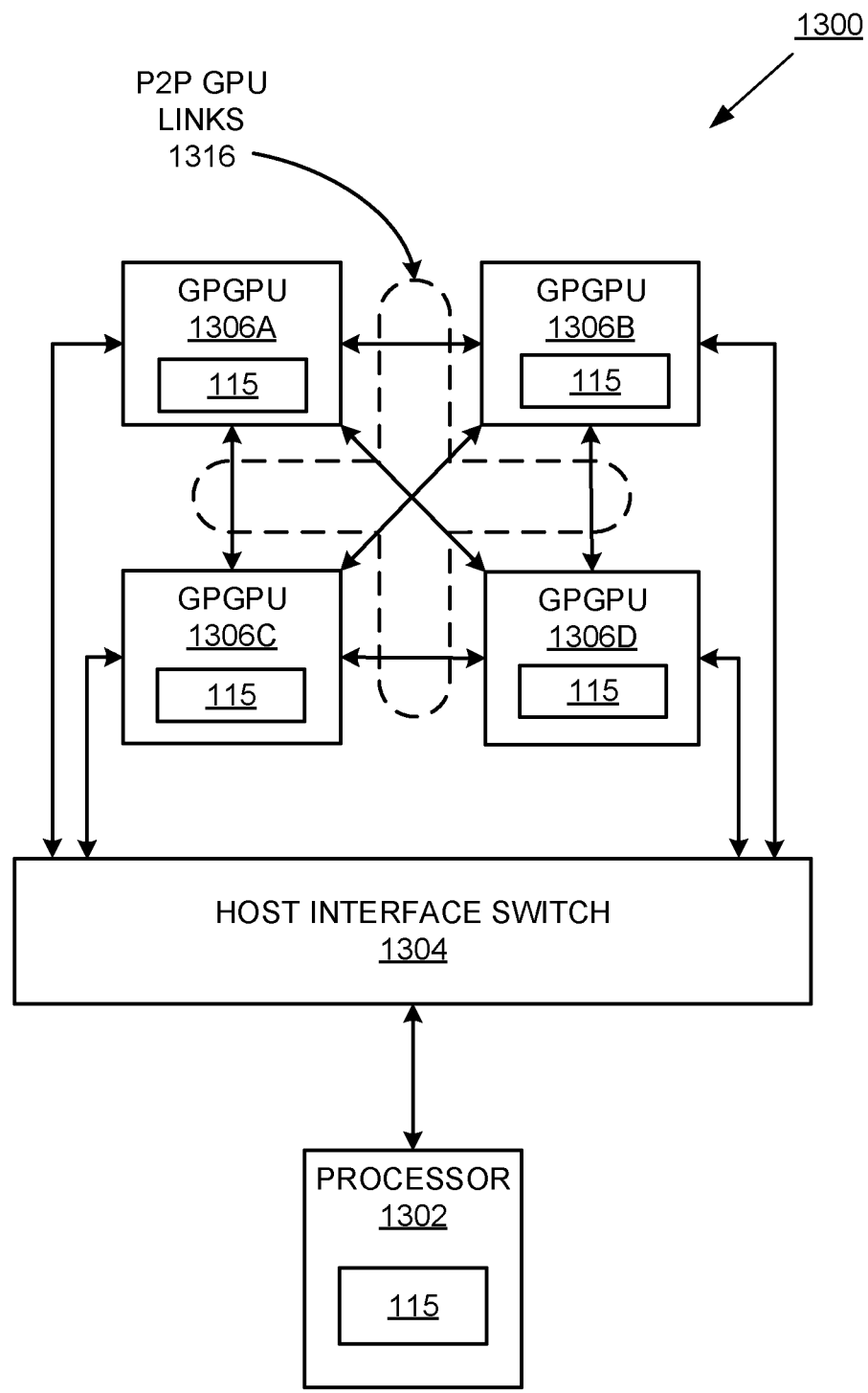
FIG. 13 illustrates a multi-graphics processing unit (GPU) system, according to at least one embodiment.

FIG. 13 illustrates a multi-GPU computing system 1300, according to at least one embodiment. In at least one embodiment, multi-GPU computing system 1300 can include a processor 1302 coupled to multiple general purpose graphics processing units (GPGPUs) 1306A-D via a host interface switch 1304. In at least one embodiment, host interface switch 1304 is a PCI express switch device that couples processor 1302 to a PCI express bus over which processor 1302 can communicate with GPGPUs 1306A-D. In at least one embodiment, GPGPUs 1306A-D can interconnect via a set of high-speed point-to-point GPU-to-GPU links 1316. In at least one embodiment, GPU-to-GPU links 1316 connect to each of GPGPUs 1306A-D via a dedicated GPU link. In at least one embodiment, P2P GPU links 1316 enable direct communication between each of GPGPUs 1306A-D without requiring communication over host interface bus 1304 to which processor 1302 is connected. In at least one embodiment, with GPU-to-GPU traffic directed to P2P GPU links 1316, host interface bus 1304 remains available for system memory access or to communicate with other instances of multi-GPU computing system 1300, for example, via one or more network devices. While in at least one embodiment GPGPUs 1306A-D connect to processor 1302 via host interface switch 1304, in at least one embodiment processor 1302 includes direct support for P2P GPU links 1316 and can connect directly to GPGPUs 1306A-D.

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in multi-GPU computing system 1300 for executing operators based, at least in part, on user provided mathematical and/or logical operations as described herein.

Figure 14:
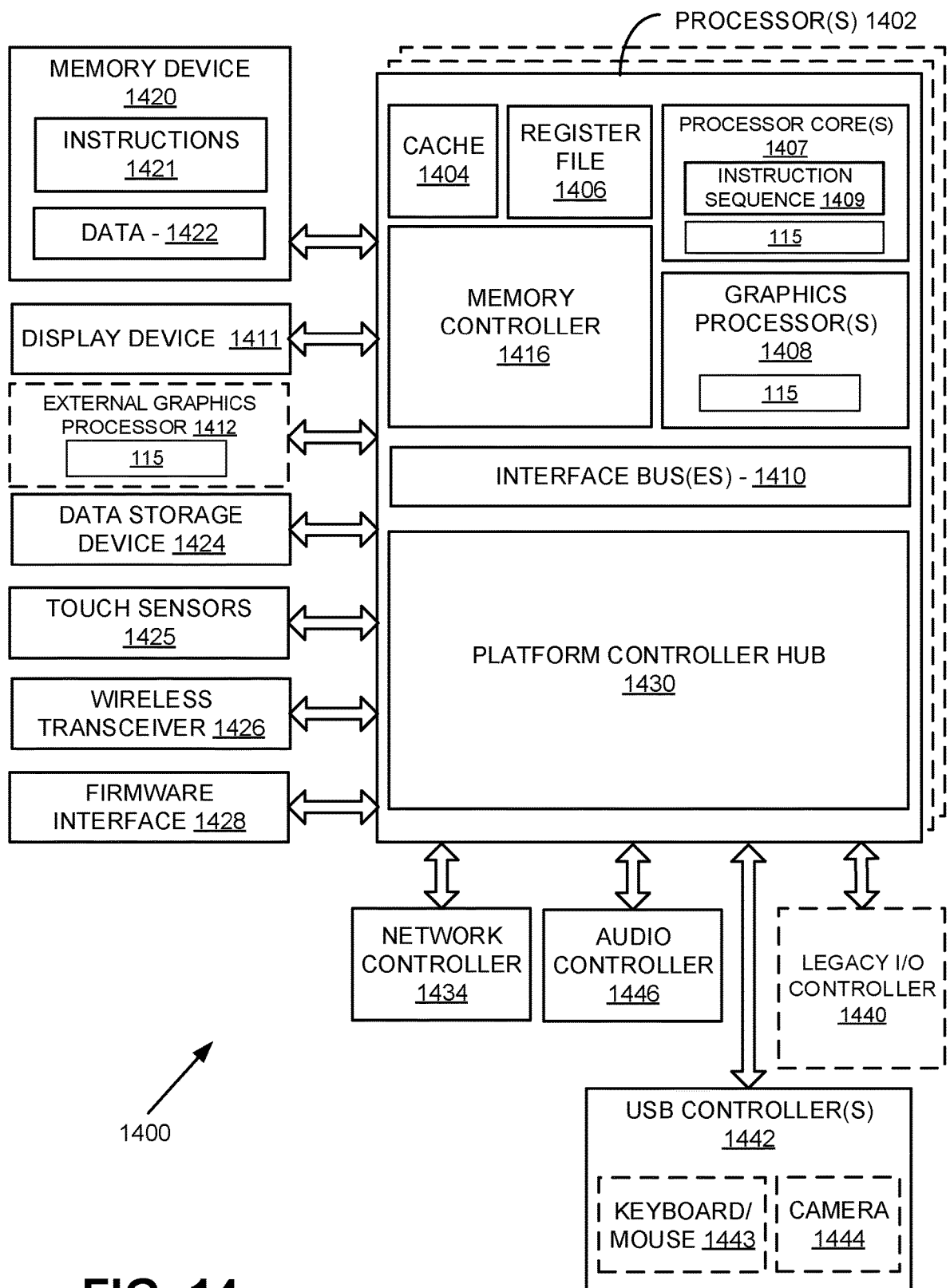
FIG. 14 illustrates at least portions of a graphics processor, according to one or more embodiments.

FIG. 14 is a block diagram of a processing system, according to at least one embodiment. In at least one embodiment, system 1400 includes one or more processors 1402 and one or more graphics processors 1408, and may be a single processor desktop system, a multiprocessor workstation system, or a server system having a large number of processors 1402 or processor cores 1407. In at least one embodiment, system 1400 is a processing platform incorporated within a system-on-a-chip (SoC) integrated circuit for use in mobile, handheld, or embedded devices.

In at least one embodiment, system 1400 can include, or be incorporated within a server-based gaming platform, a game console, including a game and media console, a mobile gaming console, a handheld game console, or an online game console. In at least one embodiment, system 1400 is a mobile phone, a smart phone, a tablet computing device or a mobile Internet device. In at least one embodiment, processing system 1400 can also include, couple with, or be integrated within a wearable device, such as a smart watch wearable device, a smart eyewear device, an augmented reality device, or a virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction sequence 1409. In at least one embodiment, instruction sequence 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction sequence 1409, which may include instructions to facilitate emulation of other instruction sequences. In at least one embodiment, processor core 1407 may also include other processing devices, such a Digital Signal Processor (DSP).

In at least one embodiment, processor 1402 includes a cache memory 1404. In at least one embodiment, processor 1402 can have a single internal cache or multiple levels of internal cache. In at least one embodiment, cache memory is shared among various components of processor 1402. In at least one embodiment, processor 1402 also uses an external cache (e.g., a Level-3 (L3) cache or Last Level Cache (LLC)) (not shown), which may be shared among processor cores 1407 using known cache coherency techniques. In at least one embodiment, a register file 1406 is additionally included in processor 1402, which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in system 1400. In at least one embodiment, interface bus 1410 can be a processor bus, such as a version of a Direct Media Interface (DMI) bus. In at least one embodiment, interface bus 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub (PCH) 1430 provides connections to I/O devices via a local I/O bus.

In at least one embodiment, a memory device 1420 can be a dynamic random access memory (DRAM) device, a static random access memory (SRAM) device, flash memory device, phase-change memory device, or some other memory device having suitable performance to serve as process memory. In at least one embodiment, memory device 1420 can operate as system memory for system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 can connect to processor(s) 1402. In at least one embodiment, display device 1411 can include one or more of an internal display device, as in a mobile electronic device or a laptop device, or an external display device attached via a display interface (e.g., DisplayPort, etc.). In at least one embodiment, display device 1411 can include a head mounted display (HMD) such as a stereoscopic display device for use in virtual reality (VR) applications or augmented reality (AR) applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 can connect via a storage interface (e.g., SATA) or via a peripheral bus, such as a Peripheral Component Interconnect bus (e.g., PCI, PCI Express). In at least one embodiment, touch sensors 1425 can include touch screen sensors, pressure sensors, or fingerprint sensors. In at least one embodiment, wireless transceiver 1426 can be a Wi-Fi transceiver, a Bluetooth transceiver, or a mobile network transceiver such as a 3G, 4G, or Long Term Evolution (LTE) transceiver. In at least one embodiment, firmware interface 1428 enables communication with system firmware, and can be, for example, a unified extensible firmware interface (UEFI). In at least one embodiment, network controller 1434 can enable a network connection to a wired network. In at least one embodiment, a high-performance network controller (not shown) couples with interface bus 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system 1400. In at least one embodiment, platform controller hub 1430 can also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, system 1400 can include an external memory controller 1416 and platform controller hub 1430, which may be configured as a memory controller hub and peripheral controller hub within a system chipset that is in communication with processor(s) 1402.

Kernel generation component 115 are used to automatically generate compute kernels to perform operations associated with one or more embodiments. Details regarding kernel generation component 115 are provided herein in conjunction with FIG. 1. In at least one embodiment, kernel generation component 115 may be used in system 1400 for executing operators based, at least in part, on user provided mathematical and/or logical operations as described herein.

Figure 15:
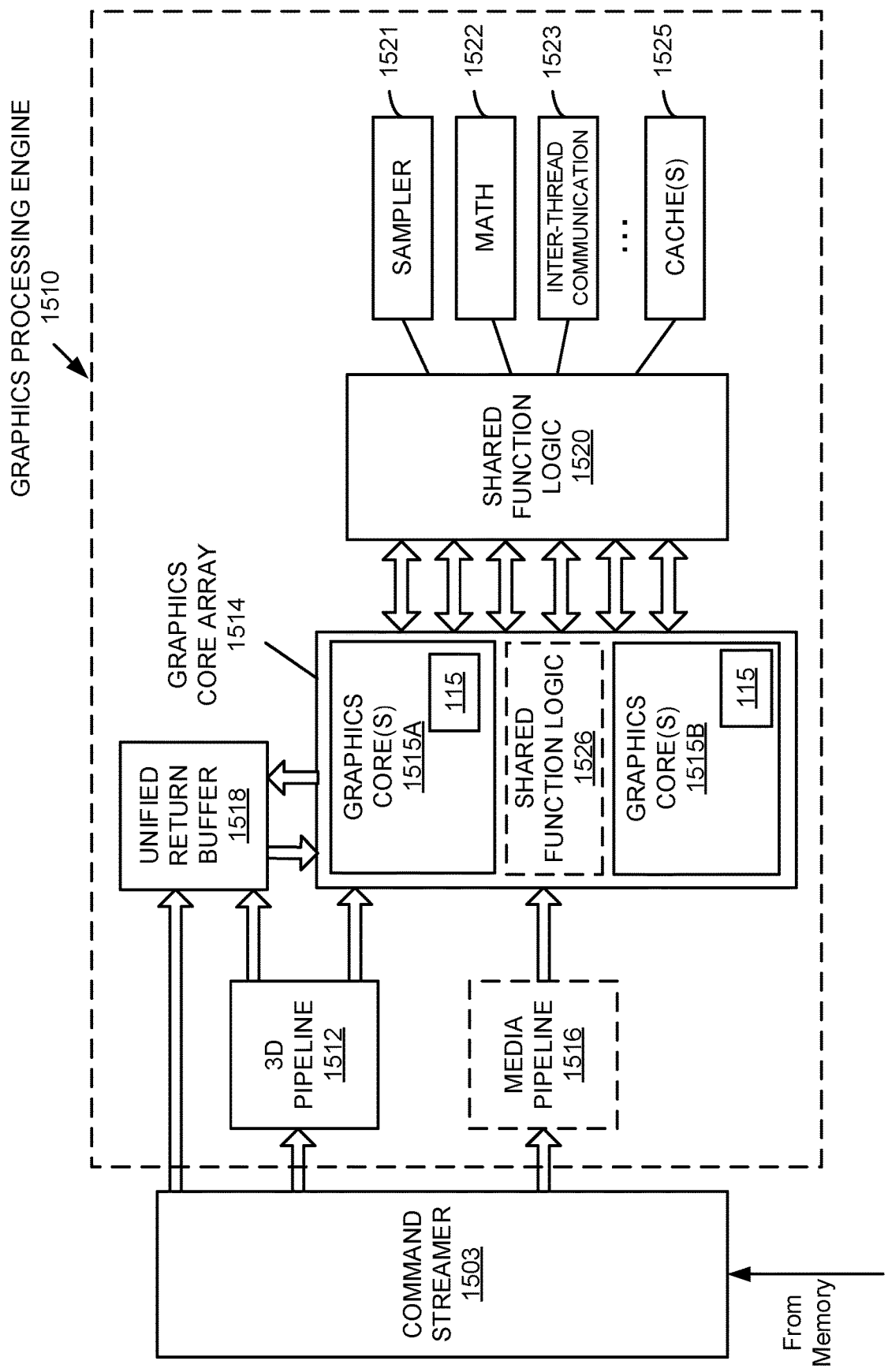
FIG. 15 is a block diagram of a graphics processing engine of a graphics processor in accordance with at least one embodiment.

FIG. 15 is a block diagram of a graphics processing engine 1510 of a graphics processor in accordance with at least one embodiment. In at least one embodiment, a media pipeline 1516 is optional and may not be explicitly included within GPE 1510. In at least one embodiment, a separate media and/or image processor is coupled to GPE 1510.

In at least one embodiment, GPE 1510 is coupled to or includes a command streamer 1503, which provides a command stream to a 3D pipeline 1512 and/or media pipeline 1516. In at least one embodiment, command streamer 1503 is coupled to memory, which can be system memory, or one or more of internal cache memory and shared cache memory. In at least one embodiment, command streamer 1503 receives commands from memory and sends commands to 3D pipeline 1512 and/or media pipeline 1516. In at least one embodiment, commands are instructions, primitives, or micro-operations fetched from a ring buffer, which stores commands for 3D pipeline 1512 and media pipeline 1516. In at least one embodiment, a ring buffer can additionally include batch command buffers storing batches of multiple commands. In at least one embodiment, commands for 3D pipeline 1512 can also include references to data stored in memory, such as, but not limited to, vertex and geometry data for 3D pipeline 1512 and/or image data and memory objects for media pipeline 1516. In at least one embodiment, 3D pipeline 1512 and media pipeline 1516 process commands and data by performing operations or by dispatching one or more execution threads to a graphics core array 1514. In at least one embodiment, graphics core array 1514 includes one or more blocks of graphics cores (e.g., graphics core(s) 1515A, graphics core(s) 1515B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 115 in FIG. 1A and FIG. 1B.

In at least one embodiment, 3D pipeline 1512 includes fixed function and programmable logic to process one or more shader programs, such as vertex shaders, geometry shaders, pixel shaders, fragment shaders, compute shaders, or other shader programs, by processing instructions and dispatching execution threads to graphics core array 1514. In at least one embodiment, graphics core array 1514 provides a unified block of execution resources for use in processing shader programs. In at least one embodiment, a multi-purpose execution logic (e.g., execution units) within graphics core(s) 1515A-1515B of graphic core array 1514 includes support for various 3D API shader languages and can execute multiple simultaneous execution threads associated with multiple shaders.

In at least one embodiment, graphics core array 1514 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 1514 can output data to memory in a unified return buffer (URB) 1518. In at least one embodiment, URB 1518 can store data for multiple threads. In at least one embodiment, URB 1518 may be used to send data between different threads executing on graphics core array 1514. In at least one embodiment, URB 1518 may additionally be used for synchronization between threads on graphics core array 1514 and fixed function logic within shared function logic 1520.

In at least one embodiment, graphics core array 1514 is scalable, such that graphics core array 1514 includes a variable number of graphics cores, each having a variable number of execution units based on a target power and performance level of GPE 1510. In at least one embodiment, execution resources are dynamically scalable, such that execution resources may be enabled or disabled as needed.

In at least one embodiment, graphics core array 1514 is coupled to shared function logic 1520 that includes multiple resources that are shared between graphics cores in graphics core array 1514. In at least one embodiment, shared functions performed by shared function logic 1520 are embodied in hardware logic units that provide specialized supplemental functionality to graphics core array 1514. In at least one embodiment, shared function logic 1520 includes but is not limited to a sampler unit 1521, a math unit 1522, and inter-thread communication (ITC) logic 1523. In at least one embodiment, one or more cache(s) 1525 are included in, or coupled to, shared function logic 1520.

In at least one embodiment, a shared function is used if demand for a specialized function is insufficient for inclusion within graphics core array 1514. In at least one embodiment, a single instantiation of a specialized function is used in shared function logic 1520 and shared among other execution resources within graphics core array 1514. In at least one embodiment, specific shared functions within shared function logic 1520 that are used extensively by graphics core array 1514 may be included within shared function logic 1520 within graphics core array 1514. In at least one embodiment, shared function logic 1520 within graphics core array 1514 can include some or all logic within shared function logic 1520. In at least one embodiment, all logic elements within shared function logic 1520 may be duplicated within shared function logic 1526 of graphics core array 1514. In at least one embodiment, shared function logic 1520 is excluded in favor of shared function logic 1526 within graphics core array 1514.

Kernel generation component 115 are used to automatically generate compute kernels to perform operations associated with one or more embodiments. Details regarding kernel generation component 115 are provided herein in conjunction with FIG. 1. In at least one embodiment portions or all of kernel generation component 115 may be incorporated into graphics processor 1510. For example, in at least one embodiment, kernel generation techniques described herein may use one or more of ALUs embodied in 3D pipeline 1512, graphics core(s) 1515, shared function logic 1526, shared function logic 1520, or other logic in FIG. 15. Moreover, in at least one embodiment, kernel generation operations described herein may be done using logic other than logic illustrated in FIG. 1. In at least one embodiment, operator parameters may be stored in on-chip or off-chip memory and/or registers (shown or not shown) that configure ALUs of graphics processor 1510 to perform one or more algorithms or techniques described herein.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, by a first processor of a computer system, one or more operations for a kernel;
automatically generating, by the first processor, one or more operators that perform the one or more operations on one or more elements of one or more tensors using at least one of template metaprogramming or operator overloading for defining the one or more operators, wherein using operator overloading for defining the one or more operators comprises performing the one or more operators on each element of the one or more tensors, and wherein using template metaprogramming for defining the one or more operators comprises constructing a sequence of operators on the one or more tensors; and
automatically generating, by the first processor, the kernel that comprises the one or more operators.

2. The method of claim 1, further comprising:
transmitting the kernel to a second processor of the computer system; and
executing, by the second processor, the kernel to execute the one or more operators and perform the one or more operations on the one or more elements of the one or more tensors.

3. The method of claim 2, wherein the first processor comprises a central processing unit (CPU) and the second processor comprises a graphical processing unit (GPU).

4. The method of claim 1, further comprising:
executing an application comprising the kernel by a first processor of a second computer system;
transmitting the kernel to a second processor of the second computer system; and
executing, by the second processor of the second computer system, the kernel to execute the one or more operators and perform the one or more operations on the one or more elements of the one or more tensors.

5. The method of claim 1, wherein the one or more operations comprise one or more variables having unspecified data types, the method further comprising:
automatically determining a data type for the one or more variables.

6. The method of claim 5, wherein the one or more operations comprises one or more mathematical expressions represented in a single function, and wherein the kernel comprises a plurality of lines of code that implement the one or more mathematical expressions on the data type.

7. The method of claim 1, wherein the one or more operations are scalar operations, and wherein a definition of the one or more operations comprises one or more expressions using template metaprogramming and operator overloading to generate the scalar operations.

8. The method of claim 1, wherein automatically generating the kernel comprises compiling the one or more operations to generate the kernel.

9. The method of claim 1, wherein automatically generating the kernel comprises:
compiling the one or more operations to generate an executable program; and
executing the executable program to generate the kernel during a runtime of the executable program.

10. A system comprising:
a memory device; and
one or more processors to:
receive, by a first processor of the one or more processors and from a second processor of the one or more processors, a compiled kernel for performing one or more operations on the first processor, the compiled kernel having been automatically generated by a third processor and comprising one or more operators that were automatically generated by the third processor to perform the one or more operations; and
execute, by the first processor, the compiled kernel to execute the one or more operators for performing the one or more operations on one or more elements of one or more tensors, wherein the one or more operators were defined using template metaprogramming by constructing a sequence of operators on the one or more tensors or using operator overloading by performing the one or more operators on each element of the one or more tensors.

11. The system of claim 10, wherein the first processor comprises a graphical processing unit (GPU) and the second processor comprises a central processing unit (CPU).

12. The system of claim 10, wherein the one or more operations comprise one or more variables having unspecified data types, and wherein to generate the kernel, the third processor is further to automatically determine a data type for the one or more variables.

13. The system of claim 12, wherein the one or more operations comprises one or more mathematical expressions represented in a single function, and wherein the kernel comprises a plurality of lines of code that implement the one or more mathematical expressions on the data type.

14. An electronic device comprising:
a memory; and
one or more processors operatively coupled to the memory to perform operations comprising:
receiving, by a first processor of the one or more processors, one or more operations for a kernel;
automatically generating, by the first processor, one or more operators that perform the one or more operations on one or more elements of one or more tensors using at least one of template metaprogramming or operator overloading for defining the one or more operators, wherein using operator overloading for defining the one or more operators comprises performing the one or more operators on each element of the one or more tensors, and wherein using template metaprogramming for defining the one or more operators comprises constructing a sequence of operators on the one or more tensors; and
automatically generating, by the first processor, the kernel that comprises the one or more operators.

15. The electronic device of claim 14, wherein the one or more processors are to perform further operations comprising:
transmitting the kernel to a second processor of the one or more processors; and
executing, by the second processor, the kernel to execute the one or more operators and perform the one or more operations on the elements of the one or more tensors.

16. The electronic device of claim 15, wherein the first processor comprises a central processing unit (CPU) and the second processor comprises a graphical processing unit (GPU).

17. The electronic device of claim 14, wherein the one or more processors are to perform further operations comprising:
executing an application comprising the kernel by a first processor of one or more processors of a second electronic device;
transmitting the kernel to a second processor of the one or more processors of the second electronic device; and
executing, by the second processor of the one or more processors of the second electronic device, the kernel to execute the one or more operators and perform the one or more operations on the one or more elements of the one or more tensors.

18. The electronic device of claim 14, wherein the one or more operations comprise one or more variables having unspecified data types, the first processor of the one or more processors is further to automatically determine a data type for the one or more variables.

19. The electronic device of claim 18, wherein the one or more operations comprises one or more mathematical expressions represented in a single function, and wherein the kernel comprises a plurality of lines of code that implement the one or more mathematical expressions on the data type.

20. The electronic device of claim 14, wherein the one or more operations are scalar operations, and wherein a definition of the one or more operations comprises one or more expressions using template metaprogramming and operator overloading to generate the scalar operations.

* * * * *